(12) United States Patent
Nomaru

(10) Patent No.: US 8,143,552 B2
(45) Date of Patent: Mar. 27, 2012

(54) LASER BEAM MACHINING SYSTEM

(75) Inventor: Keiji Nomaru, Ota-ku (JP)

(73) Assignee: Disco Corporation, Tokyo (JP)

( * ) Notice: Subject to any disclaimer, the term of this patent is extended or adjusted under 35 U.S.C. 154(b) by 1237 days.

(21) Appl. No.: 11/899,452

(22) Filed: Sep. 6, 2007

(65) Prior Publication Data

US 2008/0061042 A1   Mar. 13, 2008

(30) Foreign Application Priority Data

Sep. 12, 2006   (JP) ................................ 2006-247177

(51) Int. Cl.
*B23K 26/14* (2006.01)
*B23K 26/16* (2006.01)

(52) U.S. Cl. ............ 219/121.67; 219/121.73; 219/121.8

(58) Field of Classification Search ............ 219/121.67, 219/121.73, 121.74, 121.75, 121.8
See application file for complete search history.

(56) References Cited

U.S. PATENT DOCUMENTS

| | | | | |
|---|---|---|---|---|
| 4,705,698 | A * | 11/1987 | Van Dine | 427/555 |
| 6,437,284 | B1 * | 8/2002 | Okamoto et al. | 219/121.73 |
| 7,157,038 | B2 * | 1/2007 | Baird et al. | 264/400 |
| 7,767,930 | B2 * | 8/2010 | Wilbanks et al. | 219/121.71 |

FOREIGN PATENT DOCUMENTS

JP   2003-163323   6/2003

* cited by examiner

*Primary Examiner* — M. Alexandra Elve
(74) *Attorney, Agent, or Firm* — Greer, Burns & Crain, Ltd.

(57) ABSTRACT

A laser beam machining system including a chuck table for holding a work, and a laser beam irradiation unit for irradiating the work held on the chuck table with a laser beam, wherein the laser beam irradiation unit includes: a pulsed laser beam oscillator for oscillating a pulsed laser beam; a condenser for condensing the pulsed laser beam oscillated from the pulsed laser beam oscillator; a laser beam scanning unit disposed between the pulsed laser beam oscillator and the condenser and operative to deflect the pulsed laser beam to be inputted to the condenser; and a laser beam reshaping unit which ids disposed between the pulsed laser beam oscillator and the laser beam scanning unit and by which the energy distribution of the pulsed laser beam oscillated from the pulsed laser beam oscillator is reshaped into a top hat shape.

6 Claims, 16 Drawing Sheets

LASER BEAM MACHINING SYSTEM

BACKGROUND OF THE INVENTION

1. Field of the Invention

The present invention relates to a laser beam machining system by which laser beam machining with a uniform depth can be applied to a work.

2. Description of the Related Art

In the process of manufacturing a semiconductor device, a plurality of regions are demarcated by planned split lines called streets which are arranged in a lattice pattern on a face side of a roughly circular disk-like semiconductor wafer, and devices such as ICs and LSIs are formed respectively in the demarcated regions. Then, the semiconductor wafer is cut along the streets to split it into the regions provided with the devices, thereby producing individual semiconductor chips. In order to manufacture devices with smaller size and higher functions, a module structure has been put to practical use in which a plurality of semiconductor chips are stacked and bonding pads of the stacked semiconductor chips are connected to each other. The module structure is so configured that the semiconductor wafer is provided with through-holes (via holes) at its portions provided with electrodes, and the through-holes (via holes) are filled up with a conductive material, such as aluminum and copper, for connection with the electrodes (refer to, for example, Japanese Patent Laid-open No. 2003-163323).

The through-holes (via holes) provided in the semiconductor wafer as above-mentioned are generally formed by use of a drill. However, the through-holes (via holes) provided in the semiconductor wafer have small diameters of 100 to 300 μm, and boring by use of a drill has the problem of poor productivity. In order to solve this problem, the present applicant has proposed in Japanese Patent Application No. 2005-64867 a laser beam machining system by which minute holes can be efficiently formed in a work such as a semiconductor wafer.

The laser beam machining system thus proposed includes machining feed amount detection means for detecting the relative machining feed amounts of a chuck table holding a work thereon and laser beam irradiation means, storage means for storing the X and Y coordinate data on minute holes to be formed in the work, and control means for controlling the laser beam irradiation means on the basis of the X and Y coordinate data on the minute holes stored in the storage means and a detection signal sent from the machining feed amount detection means, wherein the work is irradiated with one pulse of a laser beam when the portion, corresponding to the X and Y coordinate data on the minute hole to be formed in the work, of the work has been brought to a position directly under a condenser of the laser beam irradiation means. However, in order to form a through-hole in the work, the same portion of the work must be irradiated with a pulsed laser beam a plurality of times. Therefore, the use of the above-mentioned laser beam machining system is not necessarily satisfactory in regard of productivity, since movement of the work must be carried out a plurality of times.

In order to meet the above-mentioned requirement, the present applicant has proposed in Japanese Patent Application No. 2005-362236 a laser beam machining system including laser beam irradiation means including acousto-optical deflection means using an acousto-optical device, wherein a laser beam oscillated by laser beam oscillation means is deflected when passing through the acousto-optical device, whereby the same work position of the work is irradiated with the laser beam while performing machining feeding of the work.

In the method of forming a laser beam-machined hole by irradiating a semiconductor wafer with a laser beam from the back side of the semiconductor wafer as above-mentioned, the same portion of the semiconductor wafer must be irradiated with the laser beam a plurality of times, and the irradiation must be so controlled as not to open a hole in the electrode, called bonding pad, formed on the face side of the semiconductor wafer. However, the energy distribution of the laser beam is a Gaussian distribution such that the energy is strongest at the center and is decreased toward the outer peripheral area. Therefore, the machining proceeds most at the central portion of the laser beam with which the work is irradiated, so that it is impossible to form a laser beam-machined hole with a uniform depth. Thus, there is the problem that the electrode (bonding pad) is melted at the central portion of the laser beam, resulting in formation of a hole there.

SUMMARY OF THE INVENTION

Accordingly, it is an object of the present invention to provide a laser beam machining system by which a substrate of a wafer is efficiently provided with laser beam-machined holes reaching electrodes, without opening any hole in the electrodes, by forming the laser beam-machined holes which are uniform in depth.

In accordance with an aspect of the present invention, there is provided a laser beam machining system including a chuck table for holding a work, and laser beam irradiation means for irradiating the work held on the chuck table with a laser beam, wherein the laser beam irradiation means includes: a pulsed laser beam oscillator for oscillating a pulsed laser beam; a condenser for condensing the pulsed laser beam oscillated from the pulsed laser beam oscillator; laser beam scanning means disposed between the pulsed laser beam oscillator and the condenser and operative to deflect the pulsed laser beam to be inputted to the condenser; and laser beam reshaping means which is disposed between the pulsed laser beam oscillator and the laser beam scanning means and by which the energy distribution of the pulsed laser beam oscillated from the pulsed laser beam oscillator is reshaped into a top hat shape.

Preferably, the laser beam reshaping means is composed of an aspherical lens. Alternatively, the laser beam reshaping means may be composed of a mask provided with a hole which permits a central portion of the pulsed laser beam oscillated from the pulsed laser beam oscillator to pass therethrough.

A collimation lens by which the laser beam reshaped by the laser beam reshaping means is corrected into a parallel laser beam may be disposed between the laser beam reshaping means and the laser beam scanning means.

Preferably, the laser beam scanning means is composed of acousto-optical deflection means. Alternatively, the laser beam scanning means may be composed of a galvano-scanner.

According to the present invention, the laser beam irradiation means includes the pulsed laser beam oscillator for oscillating a pulsed laser beam, the condenser for condensing the pulsed laser beam oscillated from the pulsed laser beam oscillator, and the laser beam scanning means disposed between the pulsed laser beam oscillator and the condenser and operative to deflect the pulsed laser beam to be inputted to the condenser. Therefore, irradiation with a plurality of pulses of the pulsed laser beam can be conducted at a predetermined work position even in the condition where the work held on the chuck table is being moved in the machining feed direction. As a result, via holes can be formed efficiently.

Besides, according to the present invention, the laser beam irradiation means includes the laser beam reshaping means which is disposed between the pulsed laser beam oscillator and the laser beam scanning means and by which the energy distribution of the pulsed laser beam oscillated from the pulsed laser beam oscillator is reshaped. Therefore, the energy distribution of the pulsed laser beam oscillated from the pulsed laser beam oscillator is reshaped into a top hat shape, and the energy distribution is made uniform at the tip of the laser beam, so that a laser beam-machined hole with a uniform depth can be formed. Accordingly, in forming via holes in a wafer, the substrate of the wafer can be provided with laser beam-machined holes reaching the electrodes, without opening any hole in the electrodes.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
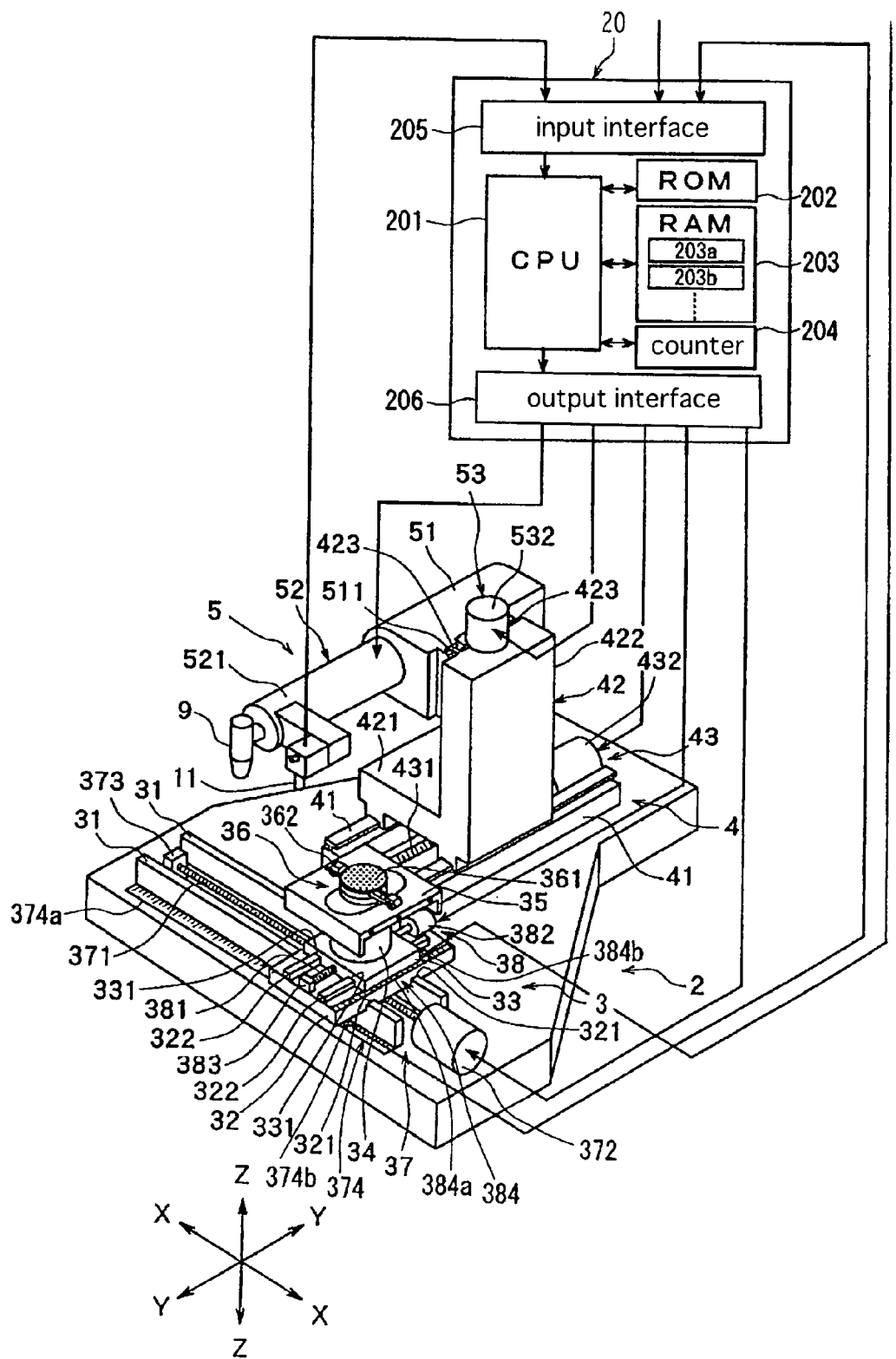
FIG. 1 is a perspective view of a laser beam machining system configured according to the present invention.

Now, preferred embodiments of the laser beam machining system configured according to the present invention will be described more in detail below, referring to the attached drawings. FIG. 1 shows a perspective view of the laser beam machining system configured according to the present invention. The laser beam machining system shown in FIG. 1 includes a stationary base 2, a chuck table mechanism 3 which is disposed on the stationary base 2 so as to be movable in a machining feed direction (X-axis direction) indicated by arrow X and which holds a work, a laser beam irradiation unit support mechanism 4 disposed on the stationary base 2 so as to be movable in an indexing feed direction (Y-axis direction) indicated by arrow Y orthogonal to the direction (X-axis direction) indicated by arrow X, and a laser beam irradiation unit 5 disposed on the laser beam irradiation unit support mechanism 4 so as to be movable in a direction (Z-axis direction) indicated by arrow Z.

The chuck table mechanism 3 includes a pair of guide rails 31, 31 disposed on the stationary base 2 in parallel to the machining feed direction (X-axis direction) indicated by arrow X, a first sliding block 32 disposed on the guide rails 31, 31 so as to be movable in the machining feed direction (X-axis direction) indicated by arrow X, a second sliding block 33 disposed on the first sliding block 32 so as to be movable in the indexing feed direction (Y-axis direction) indicated by arrow Y, a cover table 35 supported on the second sliding block 33 by a hollow cylindrical member 34, and a chuck table 36 as work holding means. The chuck table 36 includes a suction chuck 361 formed from a porous material so that a work, for example, a circular disk-like semiconductor wafer is held on the suction chuck 361 by suction means (not shown). The chuck table 36 thus configured is rotated by a pulse motor (not shown) disposed in the hollow cylindrical member 34. Incidentally, the chuck table 36 is provided with a clamp 362 for fixing an annular frame which will be described later.

The first sliding block 32 is provided in its lower surface with a pair of guided grooves 321, 321 to be fitted to the pair of guide rails 31, 31, and is provided on its upper surface with a pair of guide rails 322, 322 formed in parallel along the indexing feed direction (Y-axis direction) indicated by arrow Y. The first sliding block 32 thus configured, with its guided grooves 321, 321 fitted to the pair of guide rails 31, 31, can be moved in the machining feed direction (X-axis direction) indicated by arrow X along the pair of guide rails 31, 31. The chuck table mechanism 3 in the embodiment shown in the figure has machining feeding means 37 for moving the first sliding block 32 in the machining feed direction (X-axis direction) indicated by arrow X along the pair of guide rails 31, 31.

The machining feeding means 37 includes a male screw rod 371 disposed in parallel to and between the pair of guide rails 31 and 31, and a drive source such as a pulse motor 372 for rotatingly driving the male screw rod 371. The male screw rod 371 has one end rotatably supported by a bearing block 373 fixed to the stationary base 2, and has the other end connected on a power transmission basis to an output shaft of the pulse motor 372. Incidentally, the male screw rod 371 is in screw engagement with a female screw through-hole formed in a female screw block (not shown) provided to project from a lower surface of a central part of the first sliding block 32. Therefore, as the male screw rod 371 is driven by the pulse motor 372 to rotate normally and reversely, the first sliding block 32 is moved in the machining feed direction (X-axis direction) indicated by arrow X along the guide rails 31, 31.

The laser beam machining system in the embodiment shown in the figure includes machining feed amount detection means 374 for detecting the machining feed amount of the chuck table 36. The machining feed amount detection means 374 is composed of a linear scale 374a disposed along the guide rail 31, and a reading head 374b disposed on the first sliding block 32 and moved along the linear scale 374a together with the first sliding block 32. The reading head 374b of the feed amount detection means 374 sends a pulse signal, having one pulse per 1 μm in the embodiment shown, to control means which will be described later. The control means to be described later detects the machining feed amount of the chuck table 36 by counting the pulses in the pulse signal inputted.

Incidentally, in the case where the pulse motor 372 is used as the drive source for the machining feeding means 37, the machining feed amount of the chuck table 36 can also be detected by counting the driving pulses of a control means (described later) for outputting a driving signal to the pulse motor 372. In addition, in the case where a servo motor is used as the drive source for the machining feeding means 37, the machining feed amount of the chuck table 36 can also be detected by supplying control means (described later) with a pulse signal outputted by a rotary encoder for detecting the rotating speed of the servo motor and counting the pulses in the inputted pulse signal by the control means.

The second sliding block 33 is provided in its lower surface with a pair of guided grooves 331, 331 to be fitted to the pair of guide rails 322, 322 provided on the upper surface of the first sliding block 32, so as to be movable in the indexing feed direction (Y-axis direction) indicated by arrow Y through the fitting of the guided grooves 331, 331 to the pair of guide rails 322, 322. The chuck table mechanism 3 in the embodiment shown in the figure includes first indexing feeding means 38 for moving the second sliding block 33 in the indexing feed direction (Y-axis direction) indicated by arrow Y along the pair of guide rails 322, 322 provided on the first sliding block 32.

The first indexing feeding means 38 includes a male screw rod 381 disposed in parallel to and between the pair of guide rails 322 and 322, and a drive source such as a pulse motor 382 for rotatingly driving the male screw rod 381. The male screw rod 381 has one end rotatably supported by a bearing block 383 fixed to the upper surface of the first sliding block 32, and has the other end connected on a power transmission basis to an output shaft of the pulse motor 382. Incidentally, the male screw rod 381 is in screw engagement with a female screw through-hole formed in a female screw block (not shown) provided to project from a lower surface of a central part of the second sliding block 33. Therefore, as the male screw rod 381 is driven by the pulse motor 382 to rotate normally and reversely, the second sliding block 33 is moved in the indexing feed direction (Y-axis direction) indicated by arrow Y along the guide rails 322, 322.

The laser beam machining system in the embodiment shown in the figure includes indexing feed amount detection means 384 for detecting the indexing process feed amount of the second sliding block 33. The indexing feed amount detection means 384 is composed of a linear scale 384a disposed along the guide rail 322, and a reading head 384b disposed on the second sliding block 33 and moved along the linear scale 384a together with the second sliding block 33. The feed amount detection means 384 sends a pulse signal, having one pulse per 1 μm in the embodiment shown in the figure, to control means which will be described later. The control means to be detected later detects the indexing feed amount of the chuck table 36 by counting the pulses in the pulse signal inputted.

Incidentally, in the case where the pulse motor 382 is used as the drive source for the indexing feeding means 38, the indexing feed amount of the chuck table 36 can also be detected by counting the driving pulses of control means (described later) for outputting a driving signal to the pulse motor 382. Besides, in the case where a servo motor is used as the drive source for the first indexing feeding means 38, the indexing feed amount of the chuck table 36 can also be detected by sending a pulse signal outputted from a rotary encoder for detecting the rotating speed of the servo motor to control means (described later) and counting the pulses in the inputted pulse signal by the control means.

The laser beam irradiation unit support mechanism 4 includes a pair of guide rails 41, 41 disposed on the stationary base 2 in parallel along the indexing feed direction (Y-axis direction) indicated by arrow Y, and a movable support base disposed on the guide rails 41, 41 so as to be movable in the direction indicated by arrow Y. The movable support base 42 is composed of a movable support part 421 disposed on the guide rails 41, 41 so as to be movable, and a mounted part 422 mounted to the movable support part 421. The mounted part 422 is provided on its side surface with a pair of parallel guide rails 423, 423 extending in the direction (Z-axis direction) indicated by arrow Z. The laser beam irradiation unit support mechanism 4 in the embodiment shown in the figure includes second indexing feeding means 43 for moving the movable support base 42 in the indexing feed direction (Y-axis direction) indicated by arrow Y along the pair of guide rails 41, 41.

The second indexing feeding means 43 includes a male screw rod 431 disposed in parallel to and between the pair of guide rails 41 and 41, and a drive source such as a pulse motor 432 for rotatingly driving the male screw rod 431. The male screw rod 431 has one end rotatably supported by a bearing block (not shown) fixed to the stationary base 2, and has the other end connected on a power transmission basis to an output shaft of the pulse motor 432. Incidentally, the male screw rod 431 is in screw engagement with a female screw hole formed in a female screw block (not shown) provided to project from a lower surface of a central part of the movable support part 421 constituting the movable support base 42. Therefore, as the male screw rod 431 is driven by the pulse motor 432 to rotate normally and reversely, the movable support base 42 is moved in the indexing feed direction (Y-axis direction) indicated by arrow Y along the guide rails 41, 41.

The laser beam irradiation unit 5 in the embodiment shown in the figure includes a unit holder 51, and laser beam irradiation means 52 attached to the unit holder 51. The unit holder 51 is provided with a pair of guided grooves 511, 511 to be slidably fitted to the guide rails 423, 423 provided on the mounted part 422, and is supported so as to be movable in the direction (Z-axis direction) indicated by arrow Z, through fitting of the guided grooves 511, 511 to the guide rails 423, 423.

The laser beam irradiation unit 5 in the embodiment shown in the figure includes moving means 53 for moving the unit holder 51 in the direction (Z-axis direction) indicated by arrow Z along the pair of guide rails 423, 423. The moving means 53 includes a male screw rod (not shown) disposed between the pair of guide rails 423 and 423, and a drive source such as a pulse motor 532 for rotatingly driving the male screw rod. As the male screw rod (not shown) is driven by the pulse motor 532 to rotate normally and reversely, the unit holder 51 and the laser beam irradiation means 52 are moved in the direction (Z-axis direction) indicated by arrow Z along the guide rails 423, 423. Incidentally, in the embodiment shown in the figure, the laser beam irradiation device 52 is moved upwards when the pulse motor 532 is driven to rotate normally, and the laser beam irradiation device 52 is moved downwards when the pulse motor 532 is driven to rotate reversely.

Figure 2:
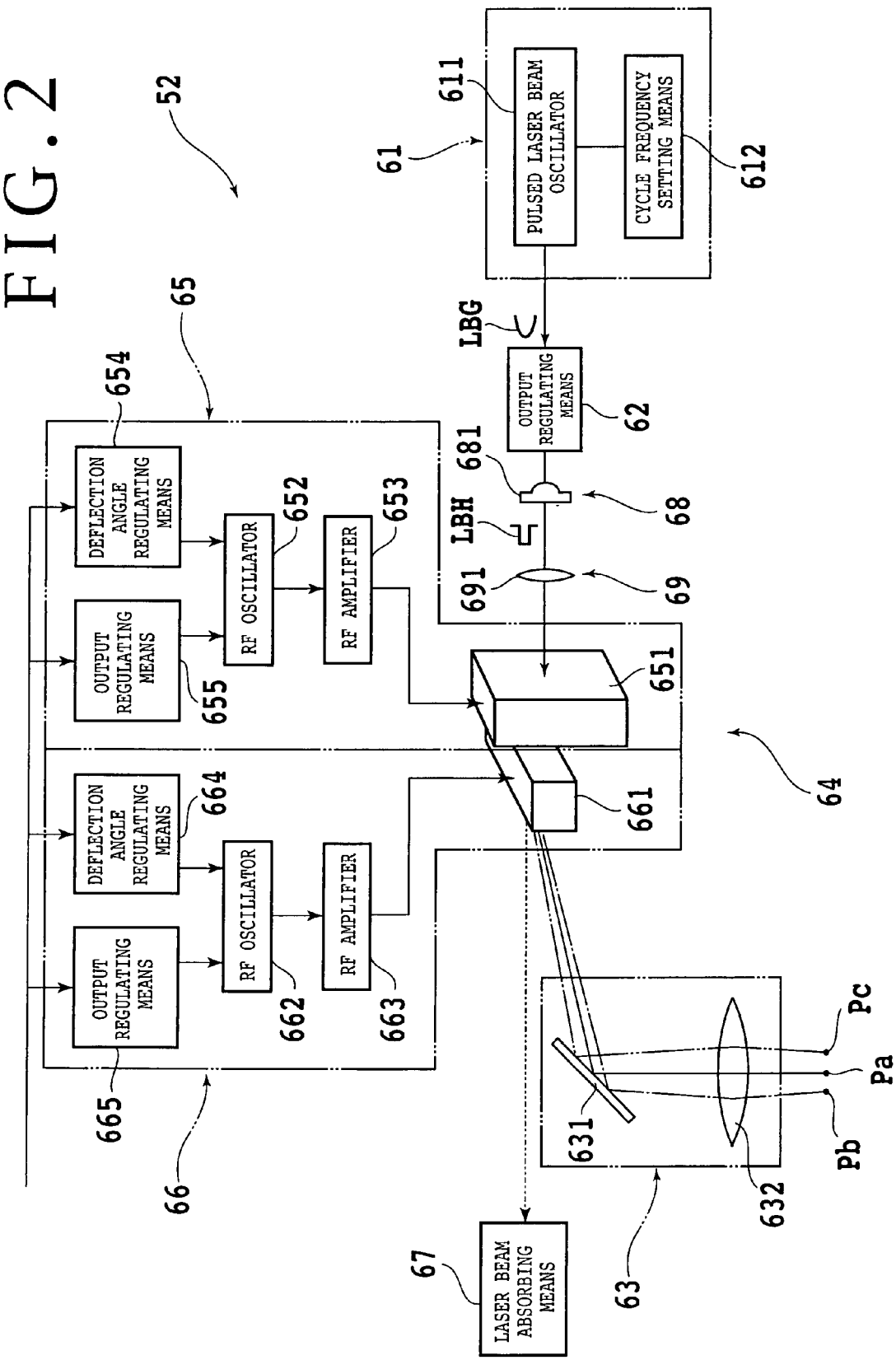
FIG. 2 is a block diagram of laser beam irradiation means with which the laser beam machining system shown in FIG. 1 is equipped.

The laser beam irradiation means 52 shown in the figure includes a hollow cylindrical casing 521 disposed substantially horizontally. As shown in FIG. 2, a pulsed laser beam oscillation means 61, output regulating means 62, and a condenser 63 for condensing a pulsed laser beam which is oscillated from the pulsed laser beam oscillation means 61 and of which the output is regulated by the output regulating means 62. The pulsed laser beam oscillation means 61 is composed of a pulsed laser beam oscillator 611, and cycle frequency setting means 612 annexed thereto.

The pulsed laser beam oscillator 611 is composed of a YVO4 laser or YAG laser oscillator in the embodiment shown in the figure, and oscillates a pulsed laser beam LB having such a wavelength (for example, 355 nm) as to be absorbed by the work formed of silicon or the like. The cycle frequency setting means 612 sets the frequency of the pulsed laser beam oscillated from the pulsed laser beam oscillator 611. The energy distribution of the pulsed laser beam LB oscillated from the pulsed laser beam oscillation means 61 configured as above-mentioned is a Gaussian distribution LBG. The output regulating means 62 regulates the pulsed laser beam LB oscillated from the pulsed laser beam oscillation means 61 to a predetermined output. The condenser 63 includes a direction changing mirror 631 for changing the direction of the pulsed laser beam LB to a downward direction, and a condenser lens 632 for condensing the laser beam direction-changed by the direction changing mirror 631, and is attached to the tip of the casing 521.

The laser beam irradiation means 52 in the embodiment shown in the figure includes a laser beam scanning means 64 disposed between the output regulating means 62 and the condenser 63 and operative to deflect the pulsed laser beam to be inputted to the condenser 63. The laser beam scanning means 64 is composed of a first acousto-optical deflection means 65 for deflecting the laser beam oscillated by the pulsed laser beam oscillation means 61 in a machining feed direction (X-axis direction), and a second asousto-optical deflection means 66 for deflecting the laser beam oscillated by the laser beam oscillation means 61 in the indexing feed direction (Y-axis direction).

The first acousto-optical deflection means 65 includes a first asousto-optical device 651 for deflecting the laser beam oscillated by the laser beam oscillation means 61 in the machining direction (X-axis direction), a first RF oscillator 652 for producing an RF (radio frequency) to be impressed on the first acousto-optical device 651, a first RF amplifier 653 for amplifying the power of the RF produced by the first RF oscillator 652 and impressing the amplified RF on the first acousto-optical device 651, a first deflection angle regulating means 654 for regulating the frequency of the RF produced by the first RF oscillator 652, and a first output regulating means 655 for regulating the amplitude of the RF produced by the first RF oscillator 652. The first acousto-optical device 651 can regulate the angle of deflection of the laser beam correspondingly to the frequency of the RF impressed thereon, and can regulate the output of the laser beam correspondingly to the amplitude of the RF impressed thereon. Incidentally, the first deflection angle regulating means 654 and the first output regulating means 655 are controlled by a control means which will be described later.

The second acousto-optical deflection means 66 includes a second acousto-optical device 661 for deflecting the laser beam oscillated by the laser beam oscillation means 61 in the indexing feed direction orthogonal to the machining feed direction (X-axis direction), a second RF oscillator 622 for producing an RF to be impressed on the second acousto-optical device 661, a second RF amplifier 663 for amplifying the power of the RF produced by the RF oscillator 662 and impressing the amplified RF on the second acousto-optical device 661, second deflection angle regulating means 664 for regulating the frequency of the RF produced by the second RF oscillator 662, and second output regulating means 665 for regulating the amplitude of the RF produced by the second RF oscillator 662. The second acousto-optical device 661 can regulated the angle of deflection of the laser beam correspondingly to the frequency of the RF impressed thereon, and can regulate the output of the laser beam correspondingly to the amplitude of the RF impressed thereon. Incidentally, the second deflection angle regulating means 664 and the second output regulating means 665 are controlled by control means which will be described later.

The laser beam irradiation device 52 in the embodiment shown in the figure includes laser beam absorbing means 67 for absorbing the laser beam deflected by the first acousto-optical device 651, as indicated by broken line in FIG. 2, in the case where an RF having a predetermined frequency is impressed on the first acousto-optical device 651.

The laser beam scanning means 64 in the embodiment shown in the figure is configured as above-mentioned, and its operation will be described below. In the case of a voltage of 10 V, for example, is impressed on the first deflection angle regulating means 654 of the first acouso-optical deflection means 65 and an RF having a frequency corresponding to 10 V is therefore impressed on the first acousto-optical device 651, the pulsed laser beam oscillated from the pulsed laser beam oscillation means 61 is deflected as indicated by solid line in FIG. 2, to be condensed into a condensation point Pa. Besides, in the case where a voltage of 15 V, for example, is impressed on the first deflection angle regulating means 654 and an RF having a frequency corresponding to 15 V is therefore impressed on the first acousto-optical device 651, the pulsed laser beam oscillated from the pulsed laser beam oscillation means 61 is deflected as indicated by dot-dash line in FIG. 2, to be condensed into a condensation point Pb which is displaced by a predetermined angle to the left side in FIG. 2 along the machining feed direction (X-axis direction) from the above-mentioned condensation point Pa.

On the other hand, in the case where a voltage of 5 V, for example, is impressed on the first deflection angle regulating means 654 and an RF having a frequency corresponding to 5 V is therefore impressed on the first acousto-optical device 651, the pulsed laser beam oscillated from the pulsed laser beam oscillation means 61 is deflected as indicated by two-dotted chain line in FIG. 2, to be condensed into a condensation point Pc which is displaced by a predetermined amount to the right side in FIG. 2 along the machining feed direction (X-axis direction) from the condensation point Pa. Further, in the case where a voltage of 0 V, for example, is impressed on the first deflection regulating means 654 of the first acousto-optical deflection means 64 and an RF having a frequency corresponding to 0 V is therefore impressed on the first acousto-optical device 651, the pulsed laser beam oscillated from the pulsed laser beam oscillation means 61 is led to the laser beam absorbing means 67, as indicated by broken line in FIG. 2. Thus, the laser beam deflected by the first acousto-optical device 651 is deflected in the machining feed direction (X-axis direction) correspondingly to the voltage impressed on the first deflection angle regulating means 654.

Figure 3A:
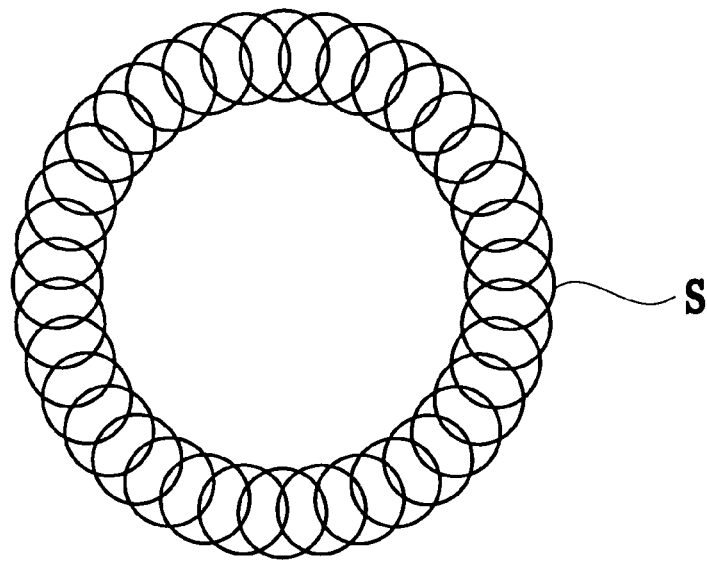
FIGS. 3A and 3B are illustrations of a trepanning process carried out by use of the laser beam irradiation means shown in FIG. 2.
Figure 3B:
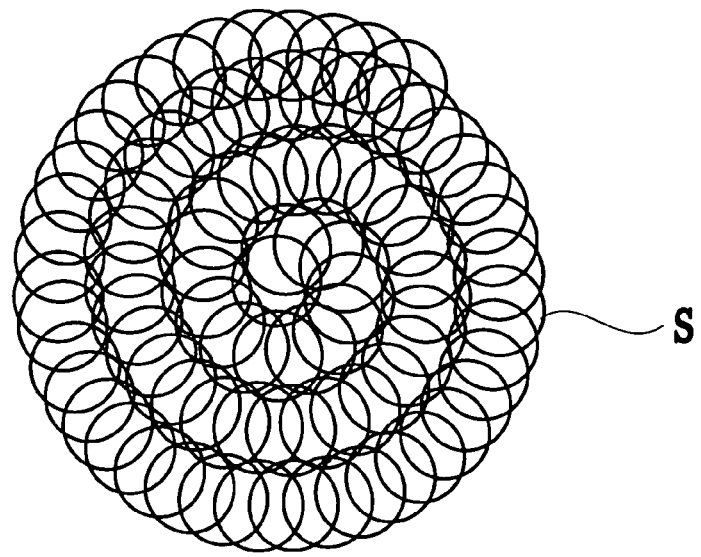

Incidentally, like the first acousto-optical deflection means 65, the second acousto-optical deflection means 66 can also deflect the pulsed laser beam oscillated from the pulsed laser beam oscillation means 61, in the indexing feed direction (Y-axis direction; the direction perpendicular to the surface of the sheet of FIG. 2) orthogonal to the machining feed direction (X-axis direction), by regulating the voltage impressed on the second deflection angle regulating means 664 and thereby regulating the frequency of the RF impressed on the second acousto-optical device 661. Therefore, by operating the first acousto-optical deflection means 65 and the second acousto-optical deflection means 66 so as to sequentially deflect the pulsed laser beam in the X-axis direction and the Y-axis direction, it is possible to perform a trepanning process in which the spot S of the pulsed laser beam is moved in an annular pattern as shown in FIG. 3B or the spot S of the pulsed laser beam is moved in a vortex pattern as shown in FIG. 3B.

Figure 4:
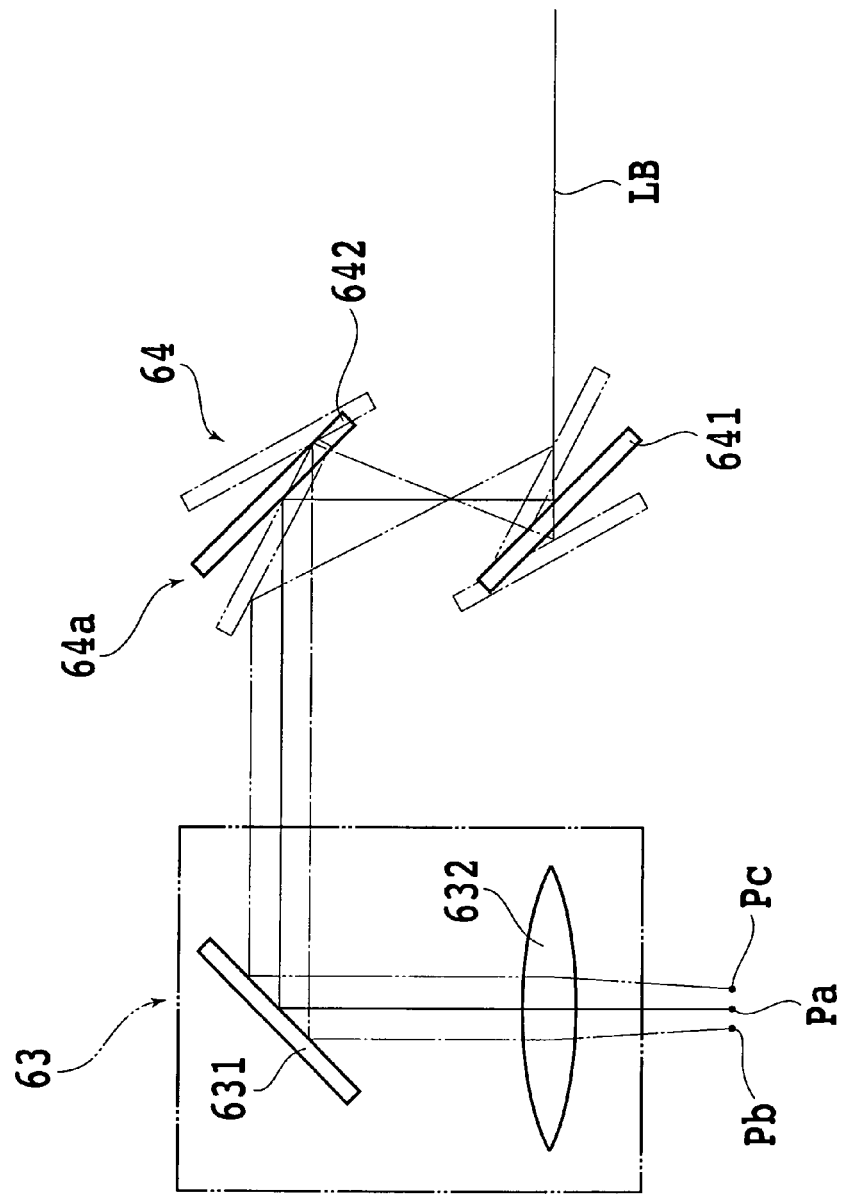
FIG. 4 is a block diagram of another embodiment of laser beam scanning means constituting the laser beam irradiation means shown in FIG. 2.
Figure 5:
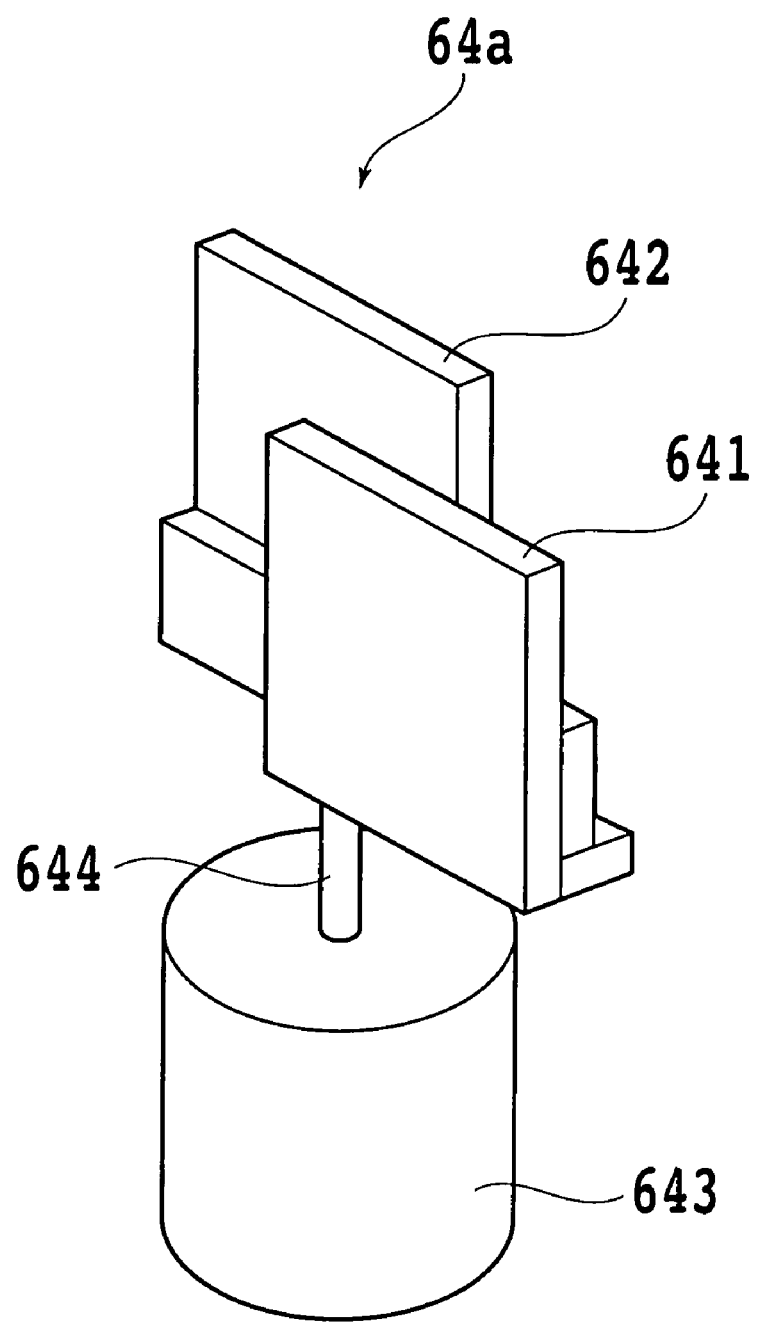
FIG. 5 is a perspective view of a galvano-scanner constituting the laser beam scanning means shown in FIG. 3.
Figure 6:
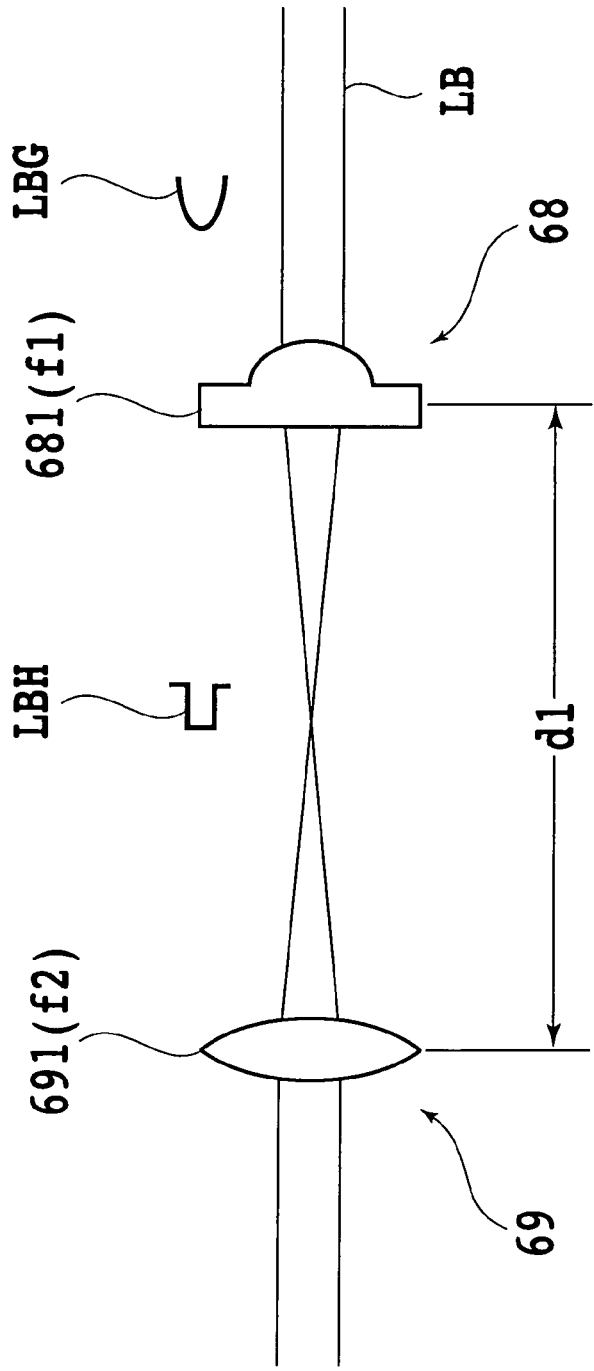
FIG. 6 is an illustration of a first embodiment of laser beam reshaping means and a collimation lens constituting the laser beam irradiation means shown in FIG. 2.

Now, another embodiment of the laser beam scanning means 64 will be described below, referring to FIGS. 4 and 5. The laser beam scanning means 64 shown in FIGS. 4 and 5 is composed of a galvano-scanner 64a. The galvano-scanner 64a constituting the laser beam scanning means 64 is composed of a pair of a first mirror 641 and a second mirror 642 which are disposed in parallel and opposite to each other with a predetermined spacing therebetween as shown in FIG. 5, and an angle regulating actuator 643 for regulating the disposition angles of the first mirror 641 and the second mirror 642. The angle regulating actuator 643 has its rotating shaft 644 connected on a power transmission basis to a connected part between the pair of the first mirror 641 and the second mirror 642. The angle regulating actuator 643 is controlled by control means which will be described later, whereby the disposition angles of the pair of the first mirror 641 and the second mirror 642 are changed in the range from the condition indicated by dot-dash lines to the condition indicated by two-dotted chain lines. In the case where the pair of the first mirror 641 and the second mirror 642 are positioned in the condition indicated by solid lines in FIG. 4, the pulsed laser beam LB oscillated from the pulsed laser beam oscillation means 61 is condensed into a condensation point Pa, as indicated by solid line in FIG. 4.

Besides, in the case where the pair of the first mirror 641 and the second mirror 642 are positioned in the condition indicated by dot-dash lines in FIG. 4, the pulsed laser beam LB oscillated from the pulsed laser beam oscillation means 61 is condensed into a condensation point Pb which is displaced by a predetermined amount to the right side in FIG. 4 along the machining feed direction (X-axis direction) from the above-mentioned condensation point Pa, as indicated by dot-dash line in FIG. 4. Further, in the case where the pair of first mirror 641 and the second mirror 642 are positioned in the condition indicated by two-dotted chain lines in FIG. 4, the pulsed laser beam LB oscillated from the pulsed laser beam oscillation means 61 is condensed into a condensation point Pb which is displaced by a predetermined amount to the left side in FIG. 4 in the machining feed direction (X-axis direction) from the condensation point Pa, as indicated by two-dotted line in FIG. 4. Incidentally, by use of an fθ lens as the condenser lens 632 of the condenser 63, the laser beams indicated by slid line, dot-dash line and two-dotted chain line inputted from the direction changing mirror 631 to the condenser lens 632 in parallel can be condensed in parallel. In addition, in the case where it is desired for the pulsed laser beam LB oscillate from the pulsed laser beam oscillation means 61 to be displaced also in the indexing feed direction (Y-axis direction; in the direction perpendicular to the surface of the sheet of FIG. 2) orthogonal to the machining feed direction (X-axis direction), it suffices to dispose another galvano-scanner on the optical path, with a phase of 90 degrees relative to the galvano-scanner 64a.

Returning to FIG. 2, the laser beam irradiation device 52 in the embodiment shown in the figure includes laser beam reshaping means 68 disposed between the output regulating means 62 and the laser beam scanning means 64 and operative to reshape the energy distribution of the pulsed laser beam oscillated from the pulsed laser beam oscillator 61 into a top hat shape, and a collimation lens 69 disposed between the laser beam reshaping means 68 and the laser beam scanning means 64 and operative to correct the laser beam reshaped by the laser beam reshaping means 68 into a parallel laser beam. The laser beam reshaping means 68 in the embodiment shown in FIG. 2 is composed of an aspherical lens 681. The aspherical lens 681 reshapes the energy distribution of the pulsed laser beam LB oscillated from the pulsed laser beam oscillation means 61 from the Gaussian distribution into the top hat shape.

The collimation lens 69 is composed of a convex lens 691 in the embodiment shown in FIG. 2. The convex lens 691 is so disposed that the focal position of the convex lens 691 is positioned in the focal position of the aspherical lens 681. More specifically, where the focal length (f1) of the aspherical lens 681 is 40 mm and the focal length (f2) of the convex lens 691 is 40 mm, the convex lens 691 is disposed at a position spaced from the aspherical lens 681 by a spacing (d1) of 80 mm. With the focal length (f1) of the aspherical lens 681, the focal length (f2) of the convex lens 691 and the spacing (d1) between the aspherical lens 681 and the convex lens 691 set in this manner, the focal length of the lens set consisting of the aspherical lens 681 and the convex lens 691 becomes infinite, so that the laser beam reshaped by the asphérical lens 681 serving as the laser beam reshaping means 68 is corrected into a parallel laser beam by the convex lens 691.

Figure 7:
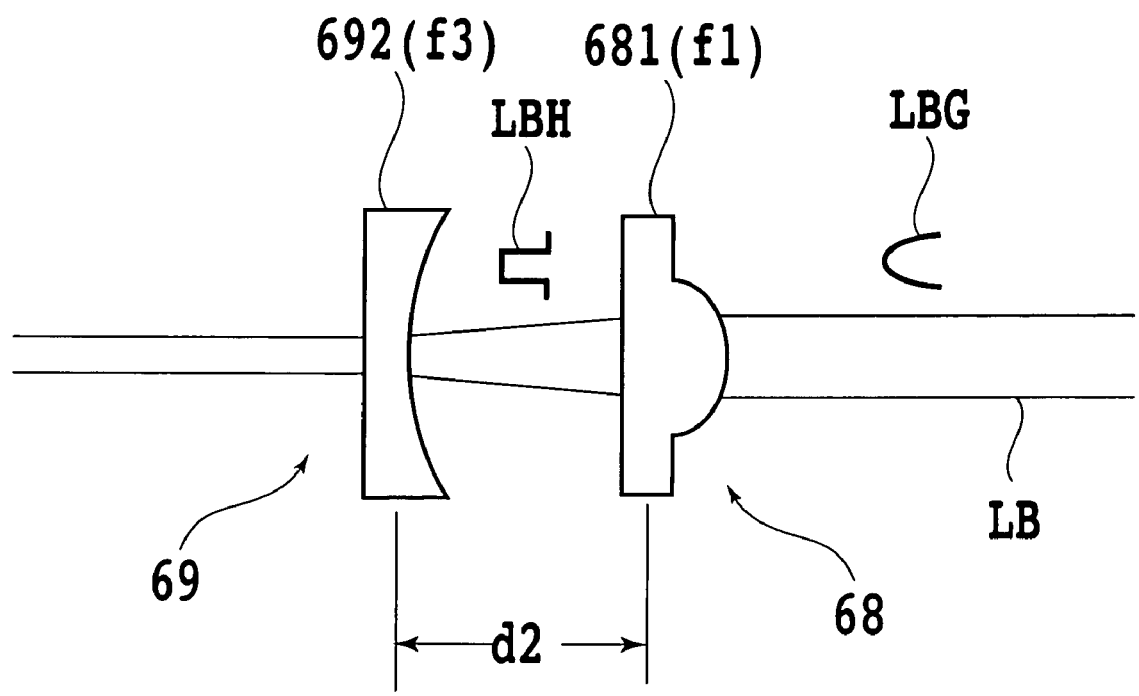
FIG. 7 is an illustration of a second embodiment of the laser beam reshaping means and the collimation lens constituting the laser beam irradiation means shown in FIG. 2.

Now, an embodiment in which the collimation lens 69 is composed of a concave lens 692 will be described below, referring to FIG. 7. In the case where the collimation lens 69 is composed of the concave lens 692 and where the focal length (f1) of the aspherical lens 681 is 40 mm and the focal lens (f3) of the concave lens 692 is −30 mm, the concave lens 692 is disposed at a position spaced from the aspherical lens 681 by a spacing (d2) of 10 mm. With the focal length (f1) of the aspherical lens 681, the focal length (f3) of the concave lens 692 and the spacing (d2) between the spherical lens 681 and the concave lens 692 set in this manner, the focal length of the lens set consisting of the aspherical lens 681 and the concave lens 692 becomes infinite, so that the laser beam reshaped by the aspherical lens 681 serving as the laser beam reshaping means 68 is corrected into a parallel laser beam by the concave lens 692. Incidentally, where the collimation lens 69 consists of the concave lens 692, the spacing (d2) between the aspherical lens 681 and the concave lens 692 can be set small.

Figure 8:
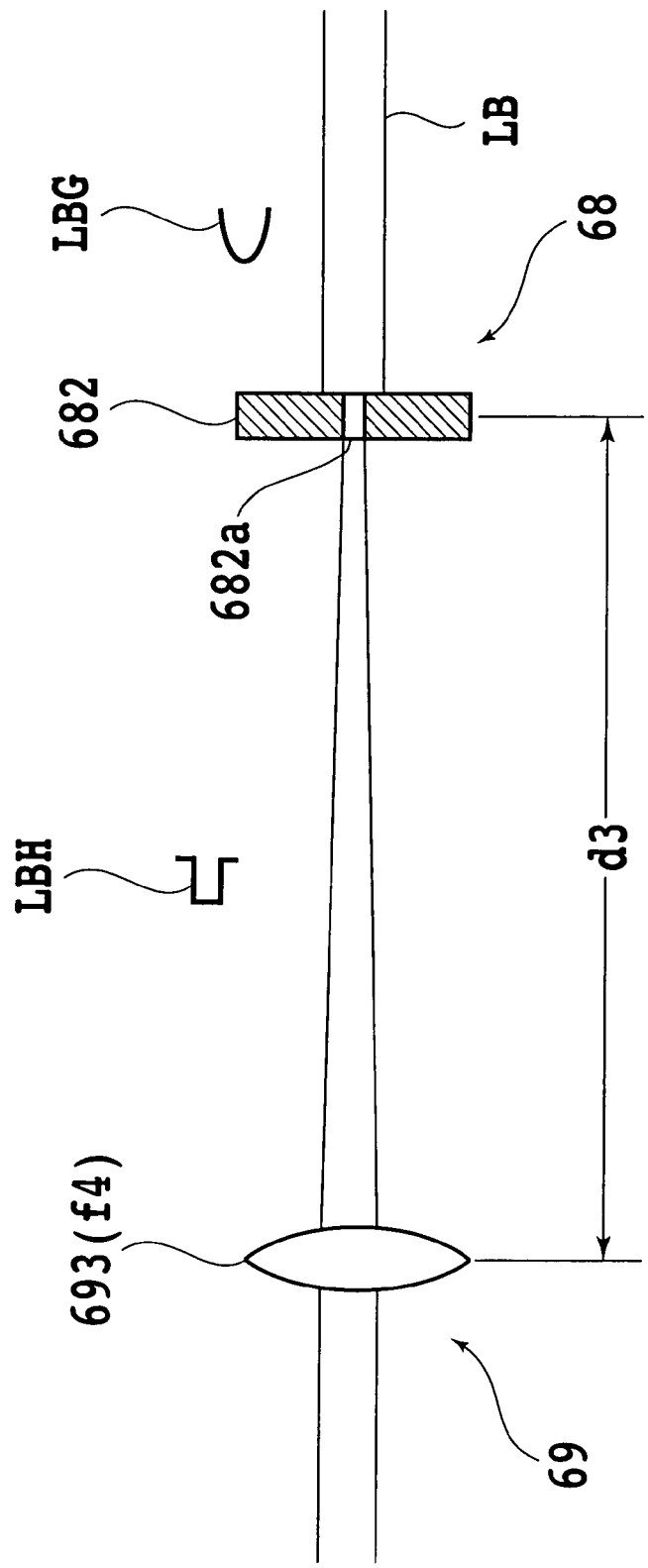
FIG. 8 is an illustration of a third embodiment of the laser beam reshaping means and the collimation lens constituting the laser beam irradiation means shown in FIG. 2.

Now, another embodiment of the laser beam reshaping means 68 will be described below, referring to FIG. 8. The laser beam reshaping means 68 shown in FIG. 8 is composed by use of a mask 682 provided with a hole 682a having a diameter of ϕ500 μm, for example. When the mask 682 provided with the hole 682a having a diameter of ϕ500 μm is thus used, only a central portion of the pulsed laser beam LB oscillated from the pulsed laser beam oscillation means 61 is permitted to pass through the hole 682*a*, so that the energy distribution of the pulsed laser beam LB is reshaped into a top hat shape. In addition, a convex lens 693 as the collimation lens 69 is disposed so that the focal position of the convex lens 693 is positioned in the hole 682*a* of the mask 682. Specifically, in the case where the focal length (f4) of the convex lens 693 is 500 mm, the convex lens 693 is disposed at a position spaced from the mask 682 by a spacing (d3) of 500 mm. With the convex lens 693 as the collimation lens 69 thus disposed so that the focal position of the convex lens 693 is positioned in the hole 682*a* of the mask 682, the laser beam having passed through the hole 682*a* of the mask 682 is corrected into a parallel laser beam by the convex lens 693. Incidentally, in the embodiment shown in FIG. 8, let the focal length of the condenser lens 652 of the condenser 63 be f5, then the size of the image formed through condensation of light by the condenser lens 632 will be changed by a factor of f5/f4.

Returning to FIG. 1, the laser beam machining system in the embodiment shown in the figure includes image pickup means 11 disposed at a front end part of the casing 521 and operative to detect a work region to be subjected to laser beam machining by the laser beam irradiation device 52. The image pickup means 11 includes not only an ordinary image pickup device (CCD) for imaging by use of visible rays but also infrared (IR) illumination means for irradiating the work with IR rays, an optical system for capturing the IR rays radiated by the IR illumination means, an image pickup device (IR CCD) for outputting an electrical signal corresponding to the IR rays captured by the optical system, and so on, and an image signal obtained through image pickup (imaging) is sent from the image pickup means 11 to control means which will be described later.

The laser beam machining system in the embodiment shown in the figure includes control means 20. The control means 20 is composed of a computer, including a central processor unit (CPU) 201 for performing arithmetic processes according to a control program, a read-only memory (ROM) 202 storing the control program and the like, a random access memory (RAM) 203 capable of reading and writing of data for storing the results of arithmetic operations, etc., a counter 204, an input interface 205, and an output interface 206. The input interface 205 of the control means 20 is supplied with detection signals from the machining feed amount detection means 374, the indexing feed amount detection means 384, the image pickup means 11, etc. Control signals are outputted from the output interface of the control means 20 to the pulse motor 372, the pulse motor 382, the pulse motor 432, the pulse motor 532, the pulsed laser beam oscillation means 61 and the output regulating means 62 of the pulsed laser beam oscillation means 52, the deflection angle regulating means 654 and the output regulating means 655 constituting the first acousto-optical deflection means 65, the deflection angle regulating means 664 and second output regulating means 665 constituting the second acousto-optical deflection means 66, etc. Incidentally, the random access memory (RAM) 203 includes a first storage region 203*a* for storing design value data on the work which will be described later, and other storage areas.

Figure 9:
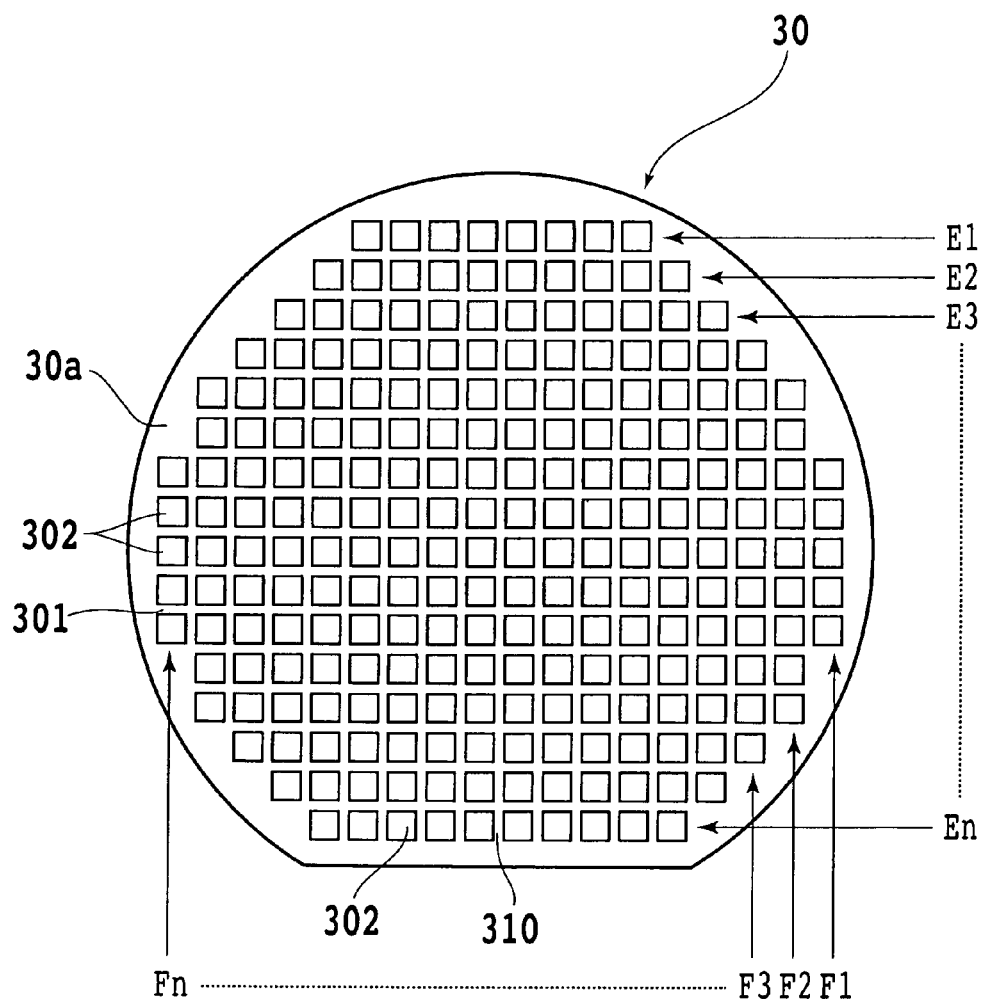
FIG. 9 is a plan view of a semiconductor wafer as a work.
Figure 10:
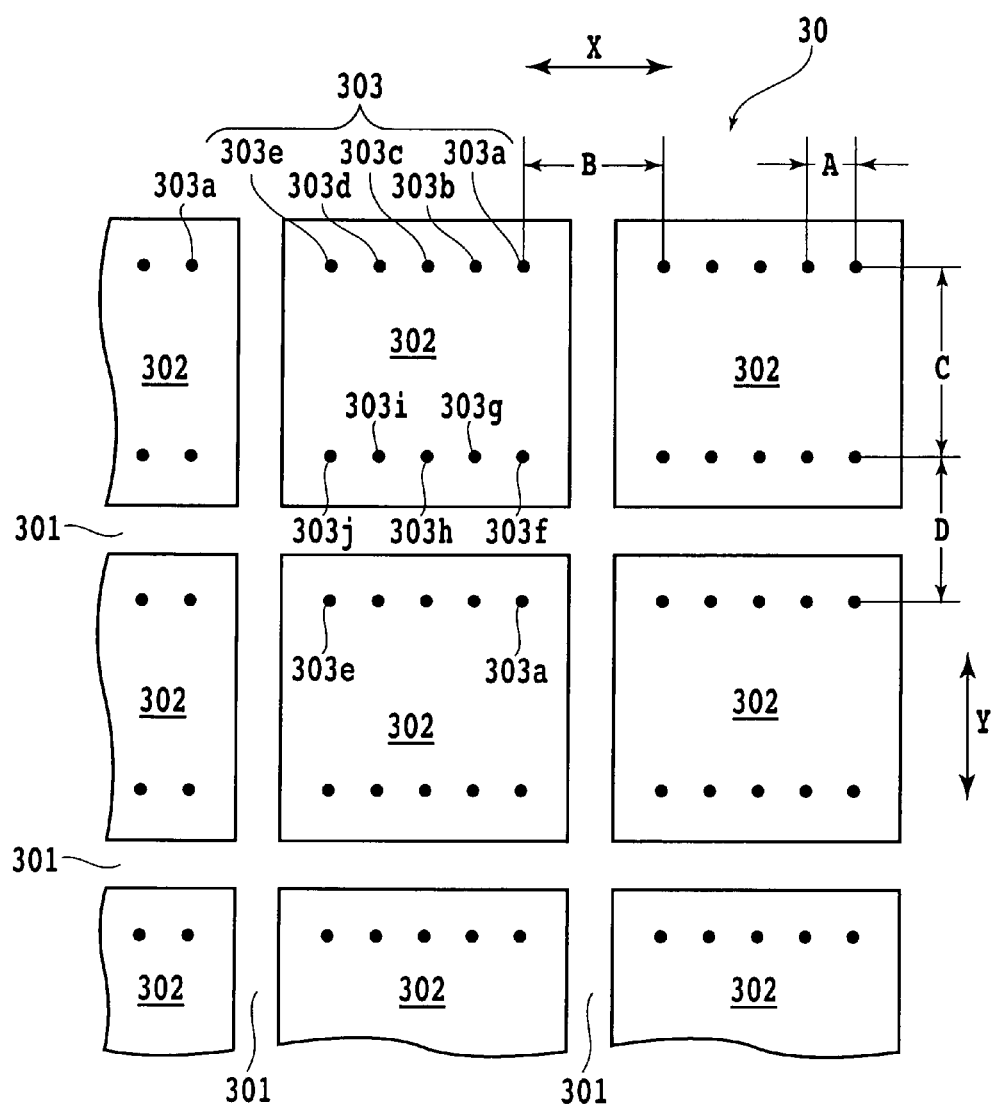
FIG. 10 is a plan view showing, in an enlarged form, apart of the semiconductor wafer shown in FIG. 9.

The laser beam machining system in the embodiment shown in the figure is configured as above, and its operation will be described below, based on an example in which the laser beam irradiation means 52 shown in FIG. 2 is provided. FIG. 9 shows a plan view of a semiconductor wafer 30 as the work to be subjected to laser beam machining. The semiconductor wafer 30 shown in FIG. 9 consists of a silicon wafer, of which the face side 30*a* is provided with a plurality of regions demarcated by a plurality of planned split lines arranged in a lattice pattern, and devices 302 such as ICs and LSIs are formed respectively in the demarcated regions. All the devices 302 have the same configuration. Each of the device 302 is provided on its face side with a plurality of electrodes 303 (303*a* to 303*j*) as shown in FIG. 10. Incidentally, in the embodiment shown in the figure, the electrodes 303*a* and 303*f*, the electrodes 303*b* and 303*g*, the electrodes 303*c* and 303*h*, the electrodes 303*d* and 303*i*, and the electrodes 303*e* and 303*j* are so located that their positions in the X direction coincide with each other. In the portions of the plurality of electrodes 303 (303*a* to 303*j*), via holes extending from the back side 10*b* of the semiconductor wafer 30 to reach the electrodes 303 are formed.

The spacing A in the X direction (the left-right direction in FIG. 10) between the electrodes 303 (303*a* to 303*j*) in each device 302 and the spacing B between the electrode 303*e* in one device 302 and the nearest electrode 303*a* in the other device 302, of each pair of devices 302 adjacent to each other in the X direction (the left-right direction in FIG. 10) with the planned split line 301 therebetween, are respectively constant in the embodiment shown in the figure. In addition, the spacing C in the Y direction (the upper-lower direction in FIG. 10) between the electrodes 303 (303*a* to 303*j*) in each device 302 and the spacing D between the electrode 303*f* (303*j*) in one device 302 and the nearest electrode 303*a* (303*e*) in the other device 302, of each pair of devices 302 adjacent to each other in the Y direction (the upper-lower direction in FIG. 10) with the planned split line 301 therebetween, are respectively constant in the embodiment shown in the figure. For the semiconductor wafer 30 configured in this manner, design value data on the numbers of the devices 302 arranged in rows E1 . . . En and columns F1 . . . Fn shown in FIG. 9 and on the above-mentioned spacings A, B, C, D are stored in the first storage region 203*a* of the random access memory (RAM) 203.

Figure 11:
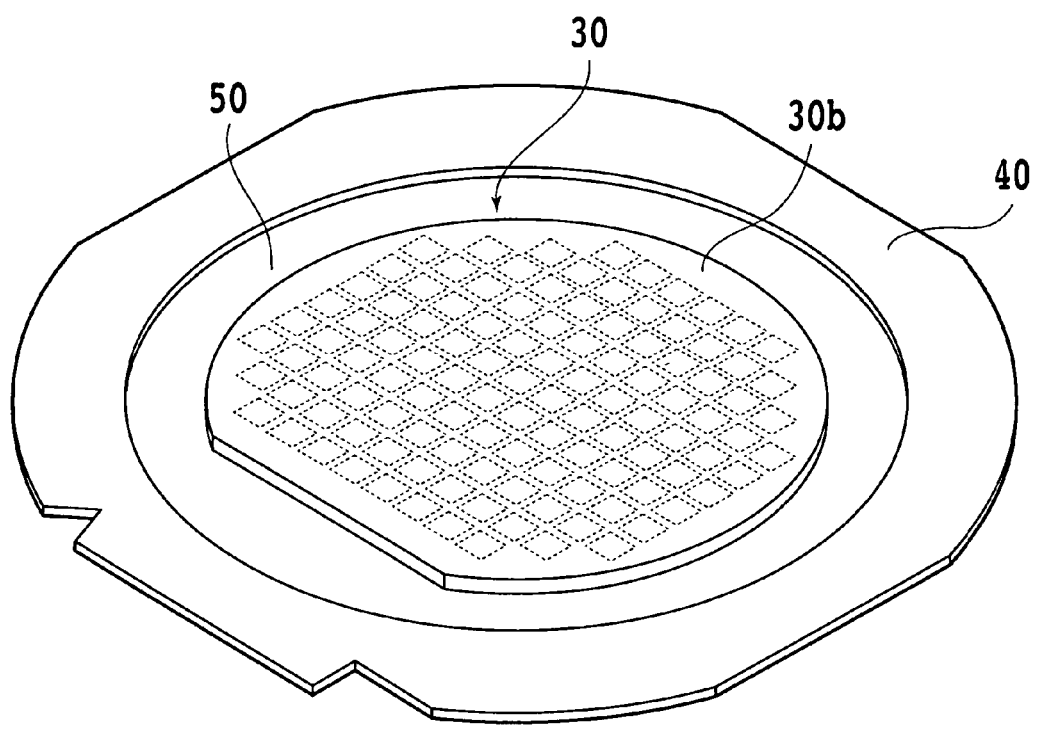
FIG. 11 is a perspective view showing the condition where the semiconductor wafer shown in FIG. 9 is adhered to a surface of a protective tape mounted to an annular frame.

Now, an embodiment of the laser beam machining for forming machined holes (via holes) in the portions of the electrodes 303 (303*a* to 303*j*) of each of the devices 302 formed on the semiconductor wafer 30, by use of the laser beam machining system as above-described, will be described below. As shown in FIG. 11, the face side 30*a* of the semiconductor wafer 30 configured as above-mentioned is adhered to a protective tape 50 composed of a sheet of a synthetic resin such as polyolefin and mounted to an annular frame 40. Therefore, the back side 30*b* of the semiconductor wafer 30 is set on the upper side. Of the semiconductor wafer 30 thus supported on the annular frame 40 through the protective tape 50, the protective tape 50 side is mounted on the chuck table 36 of the laser beam machining system shown in FIG. 1. Then, the suction means (not shown) is operated, whereby the semiconductor wafer 30 is held by suction onto the chuck table 36 through the protective tape 50. In addition, the annular frame 40 is fixed by the clamp 362.

The chuck table 36 with the semiconductor wafer 30 held thereon by suction as above-mentioned is positioned directly under the image pickup means 11 by the machining feeding means 37. When the chuck table 36 is positioned directly under the image pickup means 11, the semiconductor wafer 30 on the chuck table 36 is in the state of being positioned at a position in a coordinate system shown in FIG. 12. Under this condition, an alignment operation is carried out to ensure that the planned split lines 301 formed in a lattice pattern in the semiconductor wafer 30 held on the chuck table 301 are set in parallel to the X-axis direction and the Y-axis direction. More specifically, the semiconductor wafer 30 held on the chuck table 36 is imaged by the image pickup means 11, and image processing such as pattern matching is conducted, to thereby perform the alignment operation. In this case, though the face side 301*a* provided with the planned split lines 301 of the semiconductor wafer 30 is located on the lower side, the planned split lines 301 can be imaged on a see-through basis on the side of the back side 301*b* of the semiconductor wafer 30, since the image pickup means 11 has the image pickup means including the IR illumination means, the optical system for capturing the IR rays, the image pickup device (IR CCD) for outputting an electrical signal corresponding to the IR rays captured, and the like.

Figure 12:
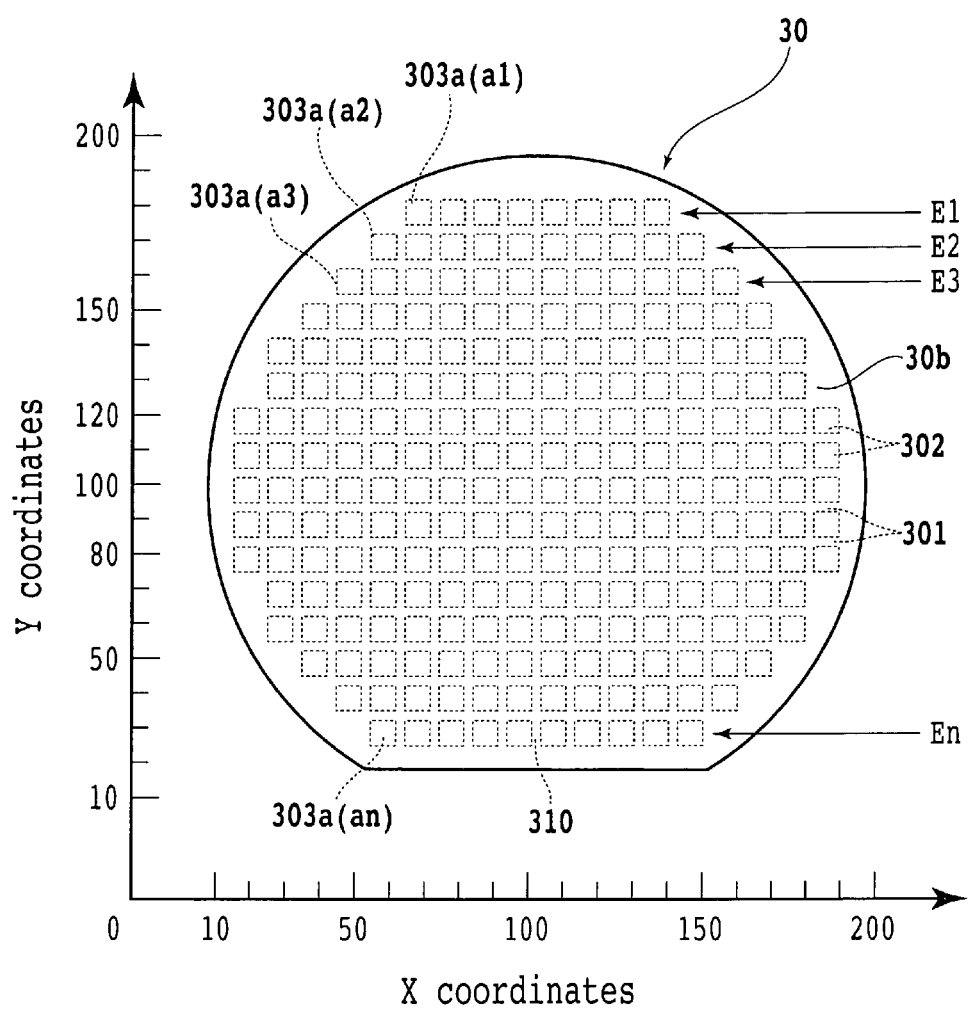
FIG. 12 is an illustration showing the relationship with coordinates of the semiconductor wafer shown in FIG. 9, in the condition of being held at a predetermined position on a chuck table of a laser beam machining system shown in FIG. 1.

Next, the chuck table 36 is moved so that the device 302 at the leftmost end in FIG. 12 in the uppermost row E1 of the devices 302 formed on the semiconductor wafer 30 is positioned directly under the image pickup means 11. Then, further, the electrode 303*a* at the leftmost uppermost position in FIG. 12 of the electrodes 303 (303*a* to 303*j*) formed on the device 302 thus positioned is positioned directly under the image pickup means 11. Under this condition, when the electrode 303*a* thus positioned is detected by the image pickup means 11, the coordinate data (a1) thereof are sent to the control means 20 as first machining feed starting position coordinate data. The control means 20 stores the coordinate data (a1) into the random access memory (RAM) 203 as the first machining feed starting position coordinate data (machining feed starting position detection step). In this case, since the image pickup means 11 and the condenser 63 of the laser beam irradiation means 52 are disposed with a predetermined spacing therebetween in the X-axis direction, an X coordinate obtained by adding the spacing between the image pickup means 11 and the condenser 63 to the X coordinate in the detected coordinate data is stored.

When the first machining feed starting position coordinate data (a1) in the device 302 in the uppermost row E1 in FIG. 12 is detected in this manner, the chuck table 36 is index fed in the Y-axis direction by the spacing of the planned split lines 301 and is moved in the X-axis direction, whereby the device 302 at the leftmost end in the second uppermost row E2 in FIG. 12 is positioned directly under the image pickup means 11. Then, further, the electrode 303*a* at the leftmost uppermost position in FIG. 12 of the electrodes 303 (303*a* to 303*j*) formed on the device 302 thus positioned is positioned directly under the image pickup means 11. Under this condition, when the electrode 303*a* thus positioned is detected by the image pickup means 11, the coordinate data (a2) thereof are sent to the control means 20 as second machining feed starting position coordinate data. Then, the control means 20 stores the coordinate data (a2) into the random access memory (RAM) 203 as second machining feed starting position coordinate data. In this case, since the image pickup means 11 and the condenser 63 of the laser beam irradiation means 52 are disposed with a predetermined spacing therebetween in the X-axis direction as above-mentioned, an X coordinate obtained by adding the spacing between the image pickup means 11 and the condenser 63 to the X coordinate in the detected coordinate data is stored. Thereafter, the control means 20 repeatedly performs the indexing feed and the machining feed starting position detection step for all the rows ranging to the lowermost row En, detects the machining feed starting position coordinate data (a3 to an) on the devices 302 formed in each of the rows, and stores the detected data into the random access memory (RAM) 203.

Figure 13A:
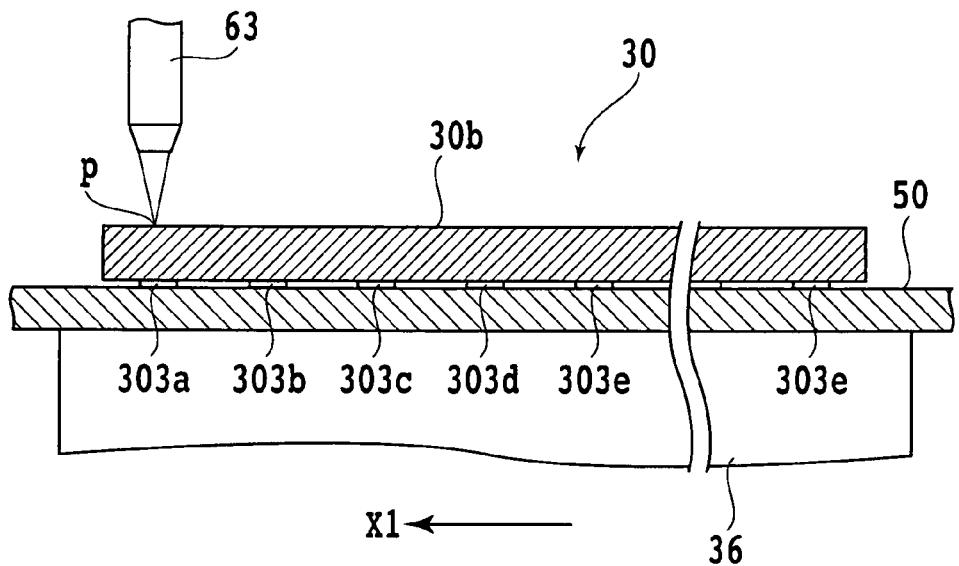
FIGS. 13A and 13B are illustrations of a boring step carried out by use of the laser beam machining system shown in FIG. 1.

Next, a boring step is carried out for boring laser beam-machined holes (via holes) in the portions, corresponding to the electrodes 303 (303*a* to 303*j*) formed on each of the devices 302, of the semiconductor wafer 30. In carrying out the boring step, first, the machining feeding means 37 and the first indexing feeding means 38 are operated to move the chuck table 36, whereby the portion corresponding to the first machining feed starting position coordinate data (a1) stored in the random access memory (RAM) 203 is positioned directly under the condenser 63 of the laser beam irradiation means 52. The condition where the portion corresponding to the first machining feed starting position coordinate data (a1) is thus positioned directly under the condenser 63 is shown in FIG. 13A. Starting from the condition shown in FIG. 13A, the control means 20 controls the machining feeding means 37 so as to perform machining feeding of the chuck table 36 at a predetermined velocity in the direction indicated by arrow X1 in FIG. 13A and, simultaneously, operates the laser beam irradiation means 52 so as to perform irradiation with a pulsed laser beam through the condenser 63 for a predetermined time. The energy density of the pulsed laser beam is desirably set at such a value that the semiconductor substrate of silicon or the like can be machined efficiently but bonding pads 303 are not machined easily, i.e., at a value of 40 to 20 J/cm$^2$.

Incidentally, the condensation point P of the laser beam radiated through the condenser 63 is adjusted to the vicinity of the face side 30*a* of the semiconductor wafer 30. During the predetermined time for which the irradiation with the pulsed laser beam is conducted, the control means 20 outputs control signals for controlling the first deflection angle regulating means 654 and the first output regulating means 655 of the first acousto-optical deflection means 65 based on a detection signal sent from a reading head 374*b* of the machining feed amount detection means 374. Specifically, the control means 20 outputs such a control signal as to output a driving pulse signal (DS) in the range of 5 to 15 V to the first deflection angle regulating means 654. Incidentally, in the boring step in the embodiment shown, the pulsed laser beam is not deflected in the Y-axis direction; therefore, the control means 20 outputs such a control signal as to impress a voltage of 0 V on the second deflection angle regulating means 664 of the second asousto-optical deflection means 66.

On the other hand, the first RF oscillator 652 outputs an RF corresponding to control signals from the first deflection angle regulating means 654 and the first output regulating means 655. The power of the RF outputted from the first RF oscillator 652 is amplified by the first RF amplifier 653, before being impressed on the first acousto-optical device 651. In addition, the second RF oscillator 662 also outputs an RF corresponding to control signals from the second deflection angle regulating means 664 and the second output regulating means 665. The power of the RF outputted from the second RF oscillator 662 is amplified by the second RF amplifier 663, before being impressed on the second acousto-optical device 661. As a result, the first acousto-optical device 651 and the second acousto-optical device 661 deflect the pulsed laser beam, which is oscillated from the pulsed laser beam oscillation means 61, within the range from the position indicated by dot-dash line in FIG. 2 to the position indicated by two-dotted chain line in FIG. 2.

An example of the machining conditions in the above-mentioned boring step will be described below.

Light source: LD excited Q switch Nd:YVO4
Wavelength: 355 nm
Cycle frequency: 50 kHz
Energy density per pulse: 30 J/cm$^2$
Spot diameter: ϕ40 μm
Machining feed velocity: 300 mm/sec When the boring step is carried out under these machining conditions, a laser beam-machined hole with a depth of about 5 μm per pulse of the pulsed laser beam can be bored in the silicon wafer. Therefore, in order to provide a 50 μm-thick silicon wafer with a machined hole reaching the electrode 303, it is necessary to irradiate the wafer with 10 pulses of the pulsed laser beam. Thus, in the above-mentioned machining conditions, the portion, corresponding to the first machining feed starting position coordinate data (a1), of the semiconductor wafer 30 held on the chuck table 36 being moved at a machining feed velocity of 300 mm/sec is irradiated with 10 pulses of the pulsed laser beam, whereby a laser beam-machined hole (via hole) reaching the electrode 303 can be formed in the semiconductor wafer 30.

Figure 14A:
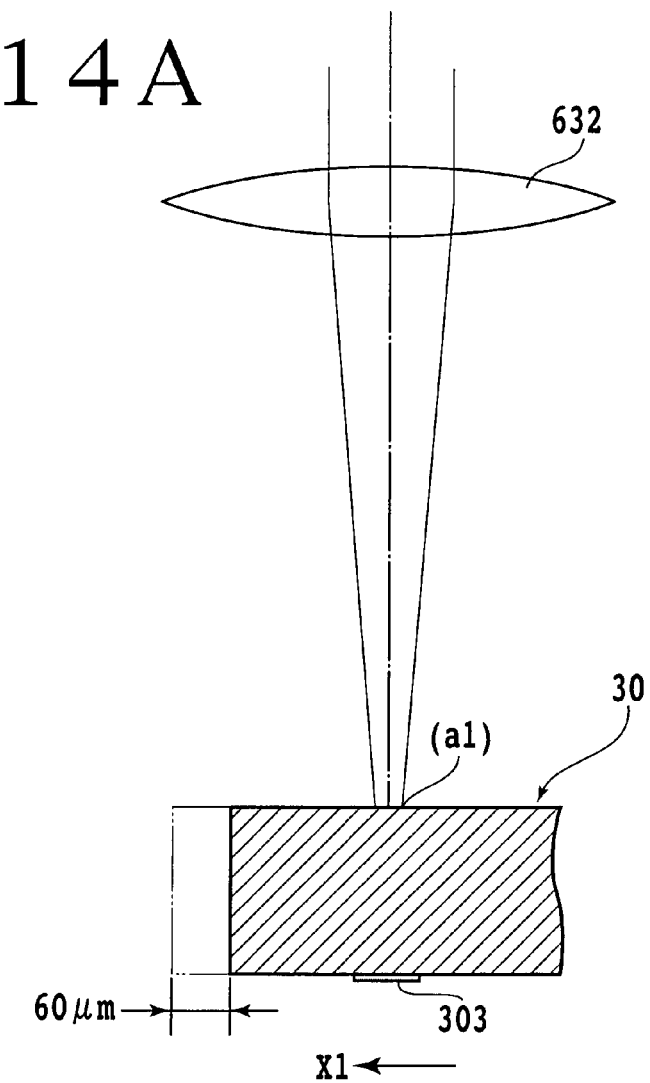
FIGS. 14A and 14B are illustrations showing, in an enlarged form, the details of the boring step shown in FIGS. 13A and 13B.
Figure 14B:
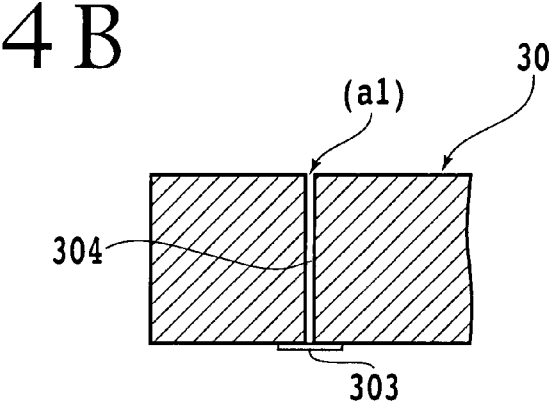

Here, a method for irradiating the portion, corresponding to the first machining feed starting position coordinate data (a1), of the semiconductor wafer 30 with 10 pulses of the pulsed laser beam in moving the semiconductor wafer 30 at a machining feed velocity of 300 mm/sec will be described, referring to FIGS. 14A and 14B. In the above-mentioned machining conditions, the cycle frequency of the pulsed laser beam is 50 kHz, so that irradiation with 50000 pulses of the pulsed laser beam takes place in one second (50000 pulses/sec). Therefore, the time taken for irradiation with 10 pulses of the pulsed laser beam is 1/5000 sec. On the other hand, the semiconductor wafer 30 being moved in the direction indicated by arrow X1 at a machining feed velocity of 300 mm/sec is moved by 60 μm in 1/5000 sec. Therefore, it suffices to perform such a control that the laser beam irradiation means 52 is operated for 1/5000 sec during the movement of the semiconductor wafer 30 by 60 μm, and, during this period, the first deflection angle regulating means 654 and the first output regulating means 655 of the first acousto-optical deflection means 65 and the second deflection angle regulating means 664 and the second output regulating means 665 of the second acousto-optical deflection means 66 are controlled so that the condensation point of the pulsed laser beam is kept positioned at the position corresponding to the first machining feed starting position coordinate data (a1).

The above-mentioned control can be achieved by a method in which, based on the detection signal from the reading head 374*b* of the machining feed amount detection means 374 as above-mentioned, the control means 20 controls the voltages to be impressed on the first deflection angle regulating means 654 and the first output regulating means 655 of the first acousto-optical deflection means 65 and on the second deflection angle regulating means 664 and the second output regulating means 665 of the second acousto-optical deflection means 66, thereby controlling the frequencies of the RF powers impressed on the first acousto-optical device 651 of the first acousto-optical deflection means 65 and the second acousto-optical device 661 of the second acouto-optical deflection means 66. As a result, even in the condition where the semiconductor wafer 30 is being moved in the machining feed direction X1, the wafer portion corresponding to the first machining feed starting position coordinate data (a1) can be irradiated with the 10 pulses of the pulsed laser beam, so that the laser beam-machined hole 304 reaching the electrode 303 can be formed in the semiconductor wafer 30 at the position corresponding to the first machining feed starting position coordinate data (a), as shown in FIG. 14B. After the wafer portion corresponding to the first machining feed starting position coordinate data (a1) is thus irradiated with the 10 pulses of the pulsed laser beam, the control means 20 impresses a voltage of 0 V on the first deflection angle regulating means 654 of the first acousto-optical deflection means 65, whereby an RF with a frequency corresponding to 0 V is impressed on the first acousto-optical device 651, and the pulsed laser beam oscillated from the pulsed laser beam oscillation means 61 is led to the laser beam absorbing means 67, as indicated by broken line in FIG. 2.

Figure 13B:
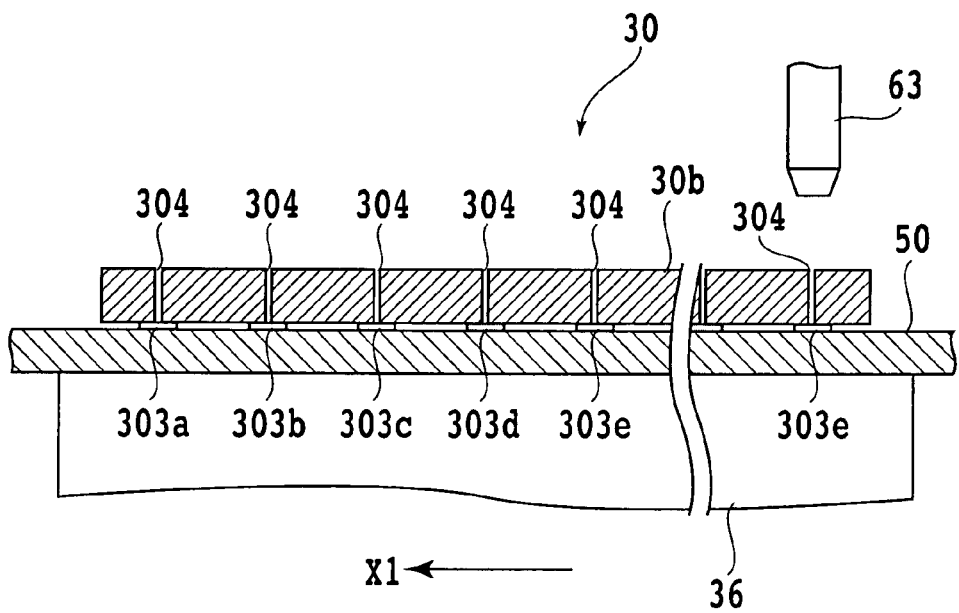

On the other hand, the control means 20 is being supplied with a detection signal from the reading head 374*b* of the machining feed amount detection means 374, and the detection signal is being counted by the counter 204. When the count obtained by the counter 204 has reached a value corresponding to the interval A in the X-axis direction in FIG. 10 of the electrodes 303, the control means 20 controls the laser beam irradiation means 52 so as to perform the above-mentioned boring step. Thereafter, also, each time the count obtained by the counter 204 has reached the intervals A and B in the X-axis direction in FIG. 10 of the electrodes 303, the control means 20 operates the laser beam irradiation means 52 so as to perform the boring step. When the boring step has been carried out at the position of the electrode 303*e* at the rightmost end in FIG. 13B of the electrodes 303 formed on the device 302 at the rightmost end in the row E1 on the semiconductor wafer 30 as shown in FIG. 13B, the operation of the machining feeding means 37 is stopped, thereby stopping the movement of the chuck table 36. As a result, the semiconductor wafer 30 is provided with the laser beam-machined holes 304 at the portions corresponding to the electrodes 303 (not shown) as shown in FIG. 13B. The energy distribution of the pulsed laser beam used for irradiation in the boring step is reshaped into the top hat shape by the aspherical lens 681 serving as the laser beam reshaping means 68, so that the energy distribution at the tip of the laser beam is uniform. Therefore, the laser beam-machined holes 304 reaching the electrodes 303 can be formed in the substrate of the wafer, without boring any hole in the electrodes 303.

Next, the control means 20 controls the first indexing feeding means 38 so that the condenser 63 of the laser beam irradiation means 52 is put into indexing feeding in the direction orthogonal to the surface of the sheet of FIG. 13B. On the other hand, the control means 20 is being supplied with a detection signal from the reading head 384*b* of the indexing feed amount detection means 384, and the detection signal is being counted by the counter 204. When the count obtained by the counter 204 has reached a value corresponding to the interval C in the Y-axis direction in FIG. 10 of the electrodes 303, the operation of the first indexing feeding means 38 is stopped, thereby stopping the indexing feeding of the condenser 63 of the laser beam irradiation means 52. As a result, the condenser 63 is positioned directly above the electrode 303*j* (see FIG. 10) opposite to the above-mentioned electrode 303*e*. This condition is shown in FIG. 15A.

Figure 15A:
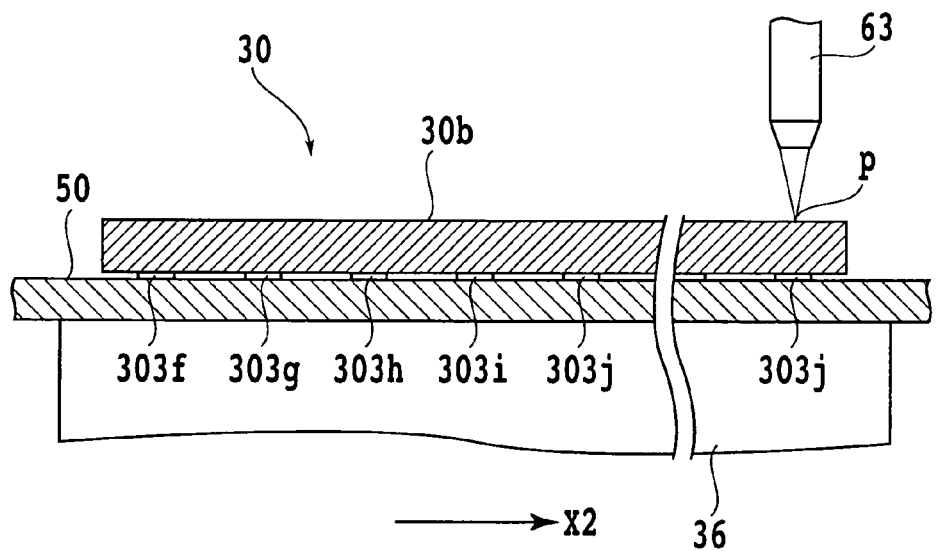
FIGS. 15A and 15B are illustrations of the boring step carried out by use of the laser beam machining system shown in FIG. 1.
Figure 15B:
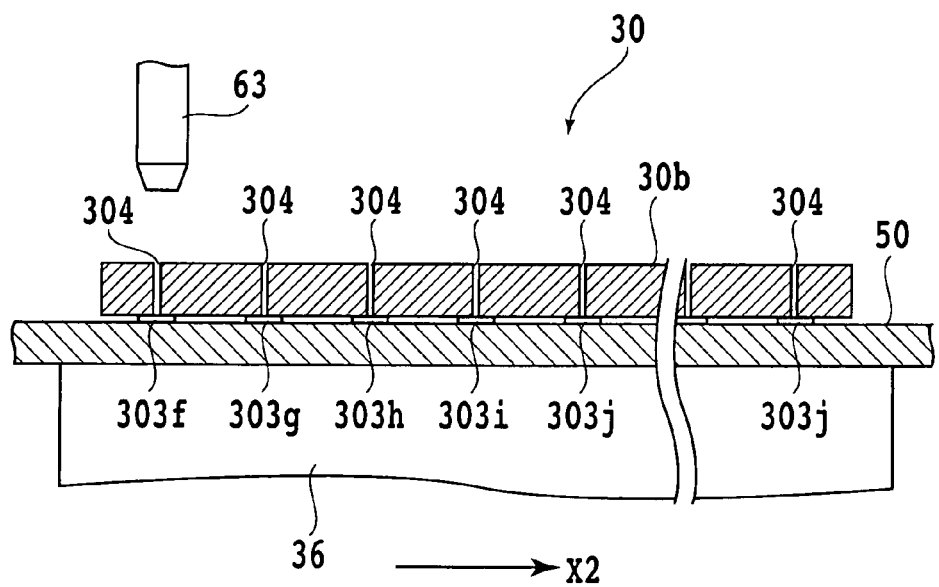

In the condition shown in FIG. 15A, the control means 20 controls the machining feeding means 37 so as to perform machining feeding of the chuck table 36 at a predetermined moving velocity in the direction indicated by arrow X2 in FIG. 15A and, simultaneously, operates the laser beam irradiation means 52 so as to carry out the boring step. Then, the control means 20 causes the counter 204 to count the detection signal sent from the reading head 374*b* of the machining feed amount detection means 374 as above-mentioned, and, each time the count has reached the intervals A and B in the X-axis direction in FIG. 10 of the electrodes 303, the control means 20 operates the laser beam irradiation means 52 so as to carry out the boring step. When the boring step has been carried out at the position of the electrode 303*f* formed on the device 302 at the rightmost end in the row E1 on the semiconductor laser 30 as shown in FIG. 15B, the operation of the machining feeding means 37 is stopped, thereby stopping the movement of the chuck table 36. As a result, the semiconductor wafer 30 is provided with the laser beam-machined holes 304 at the portions corresponding to the electrodes 303 as shown in FIG. 15B.

When the via holes 304 have thus been formed at the portions, corresponding to the electrodes 303 formed on the devices 302 in the row E1, of the semiconductor wafer 30, the control means 20 operates the machining feeding means 37 and the first indexing feeding means 38 so that the portion, corresponding to the second machining feed starting position coordinate data (a2) stored in the random access memory (RAM) 203 of the electrode 303 formed on the device 302 in the row E2, of the semiconductor wafer 30 is positioned directly under the condenser 63 of the laser beam irradiation means 52. Then, the control means 20 controls the laser beam irradiation means 52, the machining feeding means 37 and the first indexing feeding means 38 so as to carry out the boring step for boring via holes in the semiconductor wafer 30 at the positions of the electrodes 303 formed on the devices 302 in the row E2. Thereafter, the boring step is carried out for boring via holes in the semiconductor wafer 30 at the positions of the electrodes 303 formed on the devices 302 in the rows E3 to En. As a result, the laser beam-machined holes 304 are formed in the semiconductor wafer 30 at the positions of all the electrodes 303 formed on the devices 302.

Incidentally, in the boring step, irradiation of the semiconductor wafer 30 with the pulsed laser beam is not conducted for the regions of the intervals A and the regions of the intervals B in the X-axis direction in FIG. 10. For not performing the irradiation of the semiconductor wafer 30 with the pulsed laser beam in this manner, the control means 20 impresses a voltage of 0 V on the first deflection angle regulating means 654 of the first acousto-optical deflection means 65. As a result, an RF with a frequency corresponding to 0 V is impressed on the first acousto-optical device 651, whereby the pulsed laser beam (LB) oscillated from the pulsed laser beam oscillation means 61 is led to the laser beam absorbing means 67 as indicated by broken line in FIG. 2, so that the semiconductor wafer 30 is not irradiated with the pulsed laser beam.

Figure 16A:
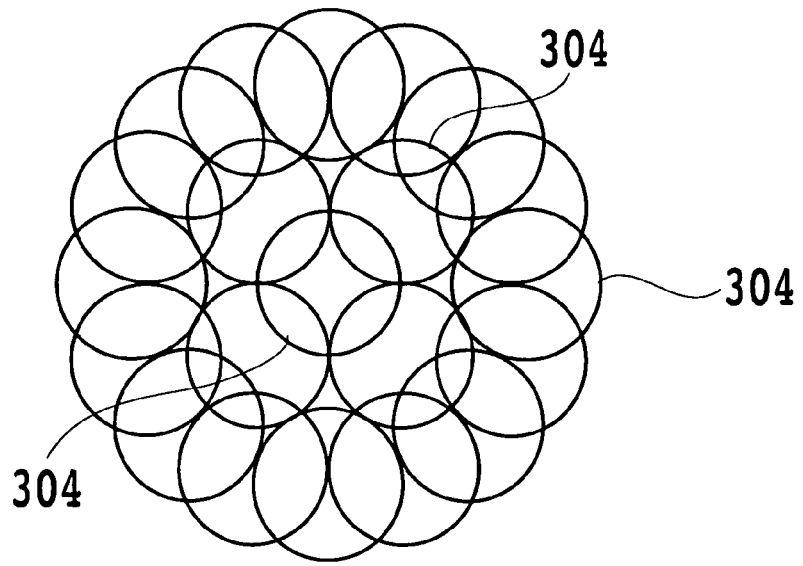
FIGS. 16A and 16B are illustrations of the formation of a laser beam-machined hole by carrying out the trepanning process by use of the laser beam machining system shown in FIG. 1.
Figure 16B:
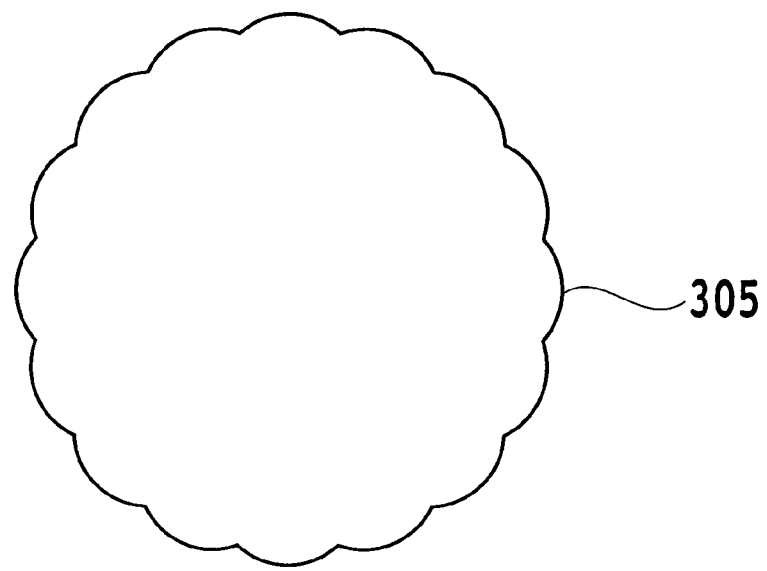

Now, another embodiment of laser beam machining conducted by operating the first acousto-optical deflection means 65 and the second acousto-optical deflection means 66 of the laser beam irradiation means 52 will be described below, referring to FIGS. 16A and 16B. In the condition where the work held on the chuck table 36 is subjected to machining feeding, the first acousto-optical deflection means 65 and the second acousto-optical deflection means 66 are operated so as to sequentially deflect the pulsed laser beam in the X-axis direction and in the Y-axis direction and to regulate the output of the pulsed laser beam, thereby irradiating the work with the pulsed laser beam. As a result, two-dimensional machining such as trepanning is applied to the work so as to form a plurality of via holes 304, as shown in FIG. 16A, whereby a hole 305 with a desired size can be opened in the work, as shown in FIG. 16B. Even in the case where the hole 305 with a desired size is opened by the trepanning process in this manner, the energy distribution at the tip of the laser beam is uniform, since the energy distribution of the pulsed laser beam used for irradiation has been reshaped into the top hat shape by the aspherical lens 681 serving as the laser beam reshaping means 68. Therefore, the laser beam-machined holes 304 reaching the electrodes 303 can be formed in the substrate of the wafer, without opening any hole in the electrodes 303.

While examples of forming laser beam-machined holes by use of the laser beam machining system according to the present invention have been shown above, the laser beam machining system of the present invention is suitable for forming a laser beam-machined groove or grooves having a uniform depth over the whole width thereof, or for removing an insulating film coating the surface of a wafer, by a predetermined width, without damaging the wafer.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser beam machining system comprising a chuck table for holding a work, the work having a substrate and a plurality of electrodes on a first side of the substrate, and laser beam irradiation means for irradiating said work held on said chuck table with a laser beam, the laser beam penetrating the substrate on a second side opposed to the first side,
wherein said laser beam irradiation means includes:
a pulsed laser beam oscillator for oscillating a pulsed laser beam;
a condenser for condensing said pulsed laser beam oscillated from said pulsed laser beam oscillator;
laser beam scanning means disposed between said pulsed laser beam oscillator and said condenser and operative to deflect said pulsed laser beam to be inputted to said condenser, said laser beam scanning means deflecting a condensation point of the pulsed laser beam to track a hole location on the substrate while the substrate is moving; and
laser beam reshaping means which is disposed between said pulsed laser beam oscillator and said laser beam scanning means and by which an energy distribution of said pulsed laser beam oscillated from said pulsed laser beam oscillator is reshaped into a top hat shape so that a laser beam machined hole having a uniform depth can be formed in the substrate, without boring a hole in the electrodes.

2. The laser beam machining system as set forth in claim 1, wherein said laser beam reshaping means is comprised of an aspherical lens.

3. The laser beam machining system as set forth in claim 1, wherein said laser beam reshaping means is comprised of a mask provided with a hole which permits a central portion of said pulsed laser beam oscillated from said pulsed laser beam oscillator to pass through said center portion of said pulsed laser beam.

4. The laser beam machining system as set forth in claim 1, wherein a collimation lens by which said laser beam reshaped by said laser beam reshaping means is corrected into a parallel laser beam is disposed between said laser beam reshaping means and said laser beam scanning means.

5. The laser beam machining system as set forth in claim 1, wherein said laser beam scanning means is comprised of acousto-optical deflection means.

6. The laser beam machining system as set forth in claim 1, wherein said laser beam scanning means is comprised of a galvano-scanner.

* * * * *